(12) United States Patent
Takeishi

(10) Patent No.: US 10,946,675 B2
(45) Date of Patent: Mar. 16, 2021

(54) RECORDING APPARATUS AND METHOD OF CONTROLLING RECORDING APPARATUS

(71) Applicant: SEIKO EPSON CORPORATION, Tokyo (JP)

(72) Inventor: Tetsuji Takeishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/545,802

(22) Filed: Aug. 20, 2019

(65) Prior Publication Data
US 2020/0062008 A1   Feb. 27, 2020

(30) Foreign Application Priority Data
Aug. 23, 2018   (JP) .............................. JP2018-156680

(51) Int. Cl.
*B41J 11/00*   (2006.01)

(52) U.S. Cl.
CPC .................................. *B41J 11/0035* (2013.01)

(58) Field of Classification Search
CPC ..... B41J 11/0035; B41J 11/009; G01B 5/068; B65H 2553/414; B65H 2553/42; B65H 2511/16; B65H 2511/135; B65H 2511/416; B65H 2511/414; B65H 2511/13; B65H 7/02; B65H 7/14
See application file for complete search history.

(56) References Cited

U.S. PATENT DOCUMENTS

| | | | |
|---|---|---|---|
| 2004/0005157 A1 | 1/2004 | Akita | |
| 2005/0270317 A1* | 12/2005 | Gao | B41J 25/308 347/8 |
| 2015/0246782 A1 | 9/2015 | Iwami | |

FOREIGN PATENT DOCUMENTS

| | | |
|---|---|---|
| JP | 2009-075119 A | 4/2009 |
| JP | 4454914 B | 4/2010 |
| JP | 2013-129521 A | 7/2013 |
| JP | 2015-160737 A | 9/2015 |

* cited by examiner

*Primary Examiner* — Bradley W Thies
(74) *Attorney, Agent, or Firm* — Workman Nydegger

(57) ABSTRACT

A recording apparatus includes a recording head performing recording on a recording medium; a cassette on which the recording medium to be transported to the recording head is placed; and a transporting path for transporting the recording medium from the cassette to the recording head. In addition, the recording apparatus includes a medium thickness sensor obtaining thickness information by measuring a thickness of the recording medium in the cassette or the transporting path; a surface information acquisition section acquiring surface information of the recording medium in the cassette or the transporting path; and a determination section specifying a type of the recording medium based on the thickness information and the surface information of the recording medium.

15 Claims, 11 Drawing Sheets

RECORDING APPARATUS AND METHOD OF CONTROLLING RECORDING APPARATUS

The present application is based on, and claims priority from JP Application Serial Number 2018-156680, filed Aug. 23, 2018, the disclosure of which is hereby incorporated by reference herein in its entirety.

BACKGROUND

1. Technical Field

The present disclosure relates to a recording apparatus having a function of determining a type of a recording medium and a method of controlling the recording apparatus in the recording apparatus that performs recording on the recording medium.

2. Related Art

The recording apparatus of this type includes, for example, a transport section that transports a recording medium (hereinafter, simply referred to as a "medium") such as a sheet, and a recording head that performs recording on the medium (for example, JP-A-2013-129521, JP-A-2015-160737, JP-A-2009-75119, and the like). When printing is performed by the recording apparatus of this type, a user sets recording conditions including the type (hereinafter, also referred to as a "medium type") of the medium such as the sheet. The recording apparatus determines a print mode based on medium type information or the like in recording condition information. However, when the user incorrectly specifies the medium type or incorrectly designates the medium to a cassette or a tray, printing is performed on the medium in a print mode which does not match an actual medium type. Therefore, in the recording apparatus, there is a demand for determining the medium type of the medium before recording.

The recording apparatus described in JP-A-2013-129521 sequentially switches a light source among a plurality of light sources, which irradiates a recording medium such as a sheet or the like on an external tray with light, to image a surface of the medium by an imaging section. It is determined whether or not the medium on the external tray is in a normal state based on a similarity between a plurality of captured image groups corresponding to a plurality of illumination conditions and a normal image group corresponding to the medium of the normal state.

In addition, the recording apparatus described in JP-A-2015-160737 includes a paper type detecting unit that detects a paper type of the sheet transported from a paper feed cassette corresponding to printing execution and a paper type determination unit that determines whether or not the paper type of the sheet under printing is changed. The paper type detecting unit detects a thickness and glossiness of the sheet using a sheet thickness detecting sensor and a glossiness detecting sensor, and detects a change in the paper type of the sheet based on the information.

Furthermore, the recording apparatus described in JP-A-2009-75119 includes a light emitting element that irradiates a surface of paper with light in an oblique direction, an area sensor that reads an inside of the irradiated region as a video, and a paper surface detecting device that reads information about paper from a reading result. In the paper surface detecting device, the light emitting element can be disposed at a predetermined angle so as to irradiate the surface of paper in a direction oblique to a transporting direction of paper, and an influence on a direction of paper fiber can be suppressed to more accurately detect the surface of paper.

However, the recording apparatus described in JP-A-2013-129521 is intended to detect, with high accuracy, abnormality of the medium before paper feeding, which is caused by abnormality of a shape of the sheet such as curling, and it is not possible to determine the medium type.

In addition, in the recording apparatus described in JP-A-2015-160737, the paper type determination unit only uses the paper thickness and the glossiness in order to determine whether a paper type of a first sheet and a paper type of a sequent sheet are the same or different, so that the paper type cannot be specified.

Furthermore, although the paper surface detecting device described in JP-A-2009-75119 can detect a paper surface state, it may not be possible to distinguish medium types having similar paper surface conditions. Therefore, even if the detected paper surface state is used to determine the medium type, the medium type cannot be determined or determination accuracy of the medium type is low depending on a combination of the medium types. As described above, all of the recording apparatuses described in JP-A-2013-129521, JP-A-2015-160737, and JP-A-2009-75119 have a problem that the type of the recording medium cannot be accurately specified.

SUMMARY

According to an aspect of the present disclosure, there is provided a recording apparatus including: a recording head performing recording on a recording medium; a placing section on which the recording medium to be transported to the recording head is placed; a transporting path for transporting the recording medium from the placing section to the recording head; a thickness information acquisition section acquiring thickness information by measuring a thickness of the recording medium in the placing section or the transporting path; a surface information acquisition section acquiring surface information of the recording medium in the placing section or the transporting path; and a determination section specifying a type of the recording medium based on the thickness information and the surface information of the recording medium.

According to another aspect of the present disclosure, there is provided a method of controlling a recording apparatus including a recording head performing recording on a recording medium, a placing section on which the recording medium to be transported to the recording head is placed, and a transporting path for transporting the recording medium from the placing section to the recording head, the method including: a thickness information acquiring step acquiring thickness information by measuring a thickness of the recording medium in the placing section or the transporting path; a surface information acquiring step of acquiring surface information of the recording medium in the placing section or the transporting path; a determination step of specifying a type of the recording medium based on the thickness information and the surface information of the recording medium; and a processing step of performing a predetermined process according to the type of the recording medium determined in the determination step.

DESCRIPTION OF EXEMPLARY EMBODIMENTS

Hereinafter, an embodiment of a recording apparatus will be described with reference to the drawings. The recording apparatus is, for example, an ink jet printer that records images such as characters and photographs by discharging ink, which is an example of a liquid, onto a recording medium such as a sheet. Assuming that a recording apparatus 11 is placed on a horizontal plane, a direction of the gravity is indicated by a Z-axis, and directions along a plane intersecting the Z-axis are indicated by an X-axis and a Y-axis. The X-axis, the Y-axis, and the Z-axis are orthogonal to one another. Therefore, the X-axis and the Y-axis are along the horizontal plane. In this case, when a medium 99 is transported in a Y-axis direction at a position at which reading is performed in the embodiment, the Y-axis direction is a transporting direction Y of the medium 99, and an X-axis direction is a width direction X of the medium 99. Therefore, in the following explanation, the X-axis direction is referred to as the width direction X, the Y-axis direction is referred to as the transporting direction Y, and a Z-axis direction is also referred to as a vertical direction Z.

Figure 1:
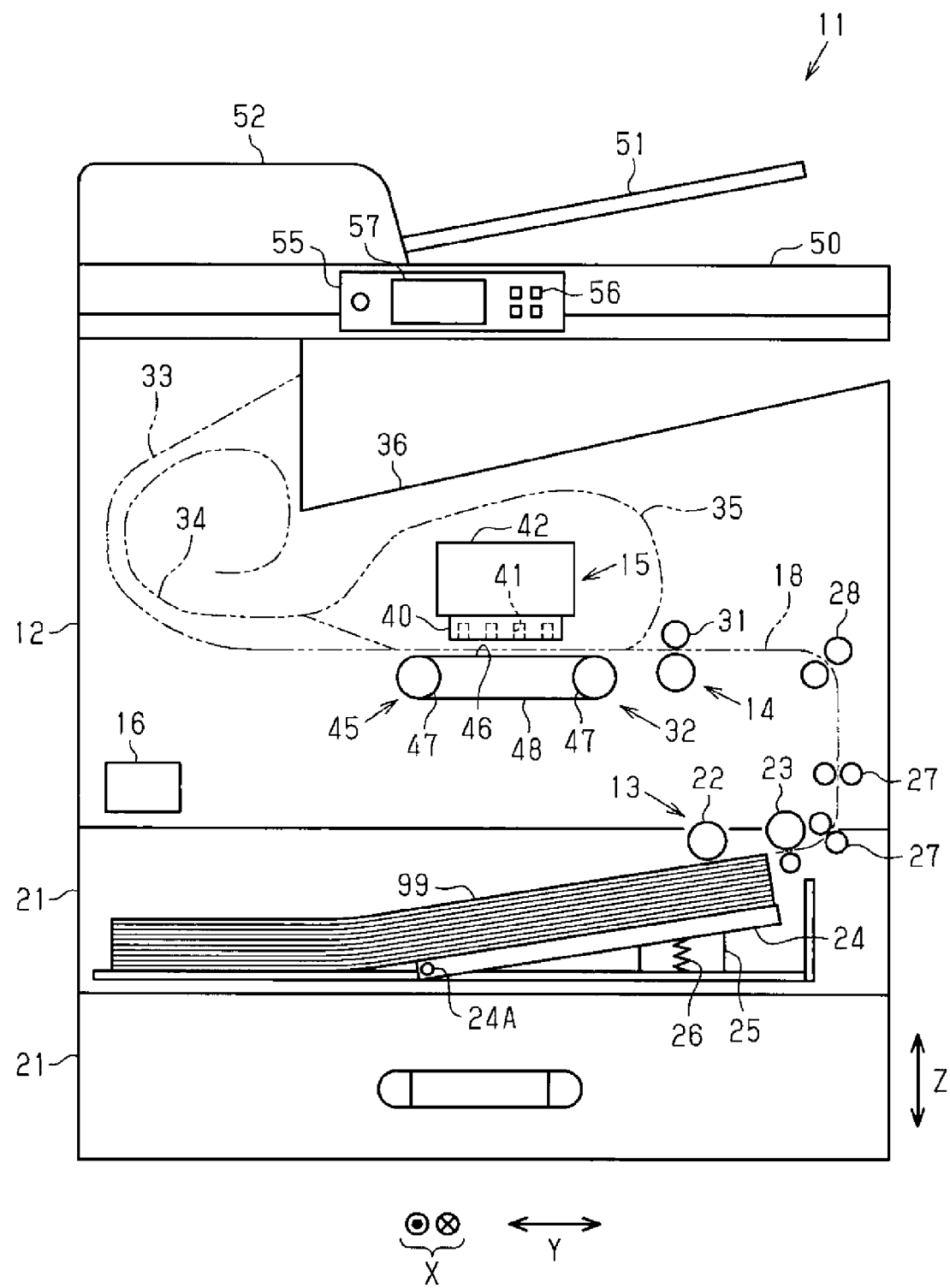
FIG. 1 is a schematic front view, which is partially broken, illustrating a recording apparatus in an embodiment.

As illustrated in FIG. 1, the recording apparatus 11 includes a housing 12. The recording apparatus 11 includes cassettes 21 for accommodating recording media 99 (hereinafter, simply, referred to as "media 99"), a feeding section 13 for feeding the medium 99 accommodated in the cassette 21, a transport section 14 transporting the medium 99 fed from the feeding section 13 along a transporting path 18, a recording section 15 performing recording on the medium 99 in the middle of the transporting path 18, and a control section 16 integrally controlling the entire apparatus.

A plurality of cassettes 21 is removably inserted into a lower portion of the housing 12. The cassette 21 accommodates a plurality of media 99 in a stacked state. The cassette 21 constitutes an example of a placing section on which the medium 99 is placed and in particular, the cassette 21 of the example constitutes an example of a storage section capable of storing the medium in a state where the medium is placed. The feeding section 13 includes a pickup roller 22 and a separation roller 23 for feeding out the medium 99 accommodated in the cassette 21. The cassette 21 includes a hopper 24 capable of being tilted in a state where the plurality of media 99 accommodated in an inner bottom portion thereof are placed. The recording apparatus 11 includes a hopper driving section 25 driving the hopper 24.

The hopper 24 is configured such that an end portion on a side away from the pickup roller 22 in a mounting and demounting direction of the cassette 21 is pivotally supported on a bottom portion of the cassette 21, and an end portion on a pickup roller 22 side is vertically displaceably tilted centering on the pivotally supported end portion. The hopper 24 is upwardly pressed by a press member 26 such as a spring to approach the pickup roller 22. In a state where the cassette 21 is separated from the housing 12, the hopper 24 is disposed at a lowered retracted position and in a state where the cassette 21 is inserted into the housing 12, the hopper 24 is disposed at a raised feeding position. When the hopper 24 is at the retracted position, the medium 99 on the hopper 24 is separated from the pickup roller 22, and when the hopper 24 is at the feeding position, the medium 99 on the hopper 24 upwardly pressed by the press member 26 is pressed by the pickup roller 22.

The pickup roller 22 feeds out the uppermost medium 99 among the media 99 accommodated in the cassette 21. The separation roller 23 separates the media 99 one by one sent out by a frictional force by the pickup roller 22. The medium 99 fed out from the cassette 21 is fed to the transport section 14 by a plurality of feeding roller pairs 27 and 28 located at positions on a downstream from the separation roller 23 in the transporting path 18. The recording apparatus 11 is not limited to the configuration in which the medium 99 is supplied from the cassette 21 and, for example, may have a configuration in which the medium 99 is supplied from a supply tray provided on a side of the housing 12. In FIG. 1, the number of the cassettes 21 capable of being inserted into the housing 12 is two, but may be one or three or more.

The transport section 14 transports the medium 99 fed from the feeding section 13 along the transporting path 18. The transport section 14 includes a transport roller 31 and a belt-type transport section 32. The transporting path 18 extends in the housing 12 as indicated by two-dot chain lines in FIG. 1. The transport roller 31 is provided in a pair with a part of the transporting path 18 interposed therebetween. A plurality of rollers (not illustrated) for transporting the medium 99 are disposed along the transporting path 18 on the downstream from the belt-type transport section 32 in the transporting direction Y.

The recording section 15 includes a recording head 40 performing recording on the medium 99. The recording head 40 includes a plurality of nozzles 41. The recording head 40 performs recording an image onto the medium 99 by discharging a liquid from the nozzles 41. The recording head 40 of the embodiment is a line head in which the width direction X of the medium 99 is a longitudinal direction. The recording head 40 is held by a holder 42. The recording head 40 may be a serial head that performs scanning with the width direction X of the medium 99 as a scanning direction. In this case, the serial-type recording section 15 includes a carriage which is guided by a guide shaft and is capable of reciprocating in the scanning direction X, and the recording head 40 mounted on the carriage. The scanning direction X is a direction intersecting (for example, orthogonal to) the transporting direction Y. The scanning direction X is the width direction X in FIG. 1.

The recording apparatus 11 includes a support section 45 that supports the medium 99 at a position facing the recording head 40. The support section 45 of the example is also used as the belt-type transport section 32. The recording head 40 and the support section 45 are positioned with a part of the transporting path 18 interposed therebetween. The support section 45 includes a support surface 46 supporting the transporting medium 99. The support section 45 of the embodiment includes a roller pair 47 and a transport belt 48 wound around the roller pair 47. As the rollers 47 rotate and the transport belt 48 revolves, the medium 99 is transported in a state of being placed on the support surface 46. The support section 45 of the embodiment supports the medium 99 and transports the medium 99. The support section 45 may be a support stand that merely supports the medium 99 without transporting the medium 99.

The recording apparatus 11 includes, as a part of the transporting path 18, a discharging path 33 through which the medium 99 is discharged, a switchback path 34 that is a path to which the medium 99 is switched back and transported, and a reverse path 35 in which a posture of the medium 99 is reversed. The discharging path 33 is a path through which the medium 99, on which recording is performed by the recording head 40, is discharged toward a stacking surface 36. The medium 99 transporting through the discharging path 33 is discharged from a discharge port (not illustrated) of the housing 12, and is stacked on the stacking surface 36.

The switchback path 34 and the reverse path 35 are paths through which the medium 99, on which recording is performed onto double sides, are transported. At the time of double-side printing, the medium 99, on which recording is performed onto one side, is discharged to the switchback path 34, is switched back, and is reversed through the reverse path, and then recording is performed onto a back surface. The medium 99, on which recording is performed onto the double sides, is discharged to the stacking surface 36 by being transported through the discharging path 33.

In addition, as illustrated in FIG. 1, the recording apparatus 11 is a multifunction peripheral including a scanner section 50 that reads a document, on an upper portion of the housing 12. An upper portion of the scanner section 50 is provided with a document tray 51 on which a plurality of documents are placed, and an automatic document feeder 52 sequentially feeding the documents on the document tray 51 to the scanner section 50. In addition, an operation panel 55 is provided on an upper front side of the recording apparatus 11. The operation panel 55 includes an operation section 56 and a display section 57. The operation section 56 is operated when a user gives the recording apparatus 11 various instructions. The display section 57 displays a menu and various massages.

Next, a configuration of a periphery of the feeding section 13 including the hopper 24 will be described with reference to FIG. 2. The hopper 24 of the example is an electric type in which the hopper driving section 25 includes an electric motor 25M. The hopper 24 is capable of being tilted centering on a pin 24A at one end portion thereof, and is coupled to the electric motor 25M via a power transmission mechanism so as to be capable of transmitting power. The power transmission mechanism includes, for example, a rack and pinion mechanism or a cam mechanism. In a region in which the power of the electric motor 25M to the hopper 24 is released, a pressing force of the press member 26 presses the medium 99 on the hopper 24 against the pickup roller 22. Therefore, control of a height position of the hopper 24 can be performed by rotational position control of the electric motor 25M.

The hopper 24 is configured such that an end portion on a supply port side can be vertically displaced with the pin 24A as a fulcrum. The hopper 24 is disposed at the retracted position indicated by a two-dot chain line and the feeding position indicated by a solid line in FIG. 2 by driving the press member 26 and the hopper driving section 25. The hopper 24 is raised to the feeding position at which the medium 99 fed next in the cassette 21 abuts against the pickup roller 22. Therefore, the medium 99 before the start of feeding is disposed at a constant position at which the medium 99 abuts against the pickup roller 22 regardless of the number of the media 99 in the cassette. An upward movement of the hopper 24 may be electrically driven and lowering of the hopper 24 when the cassette 21 is removed from the housing 12 may be mechanically performed. As an example of the configuration to mechanically lower the hopper 24, in a process of removing the cassette, the hopper 24 is guided by a guide on a housing 12 side, is lowered against the pressing force of the press member 26, and is locked at the retracted position.

Figure 2:
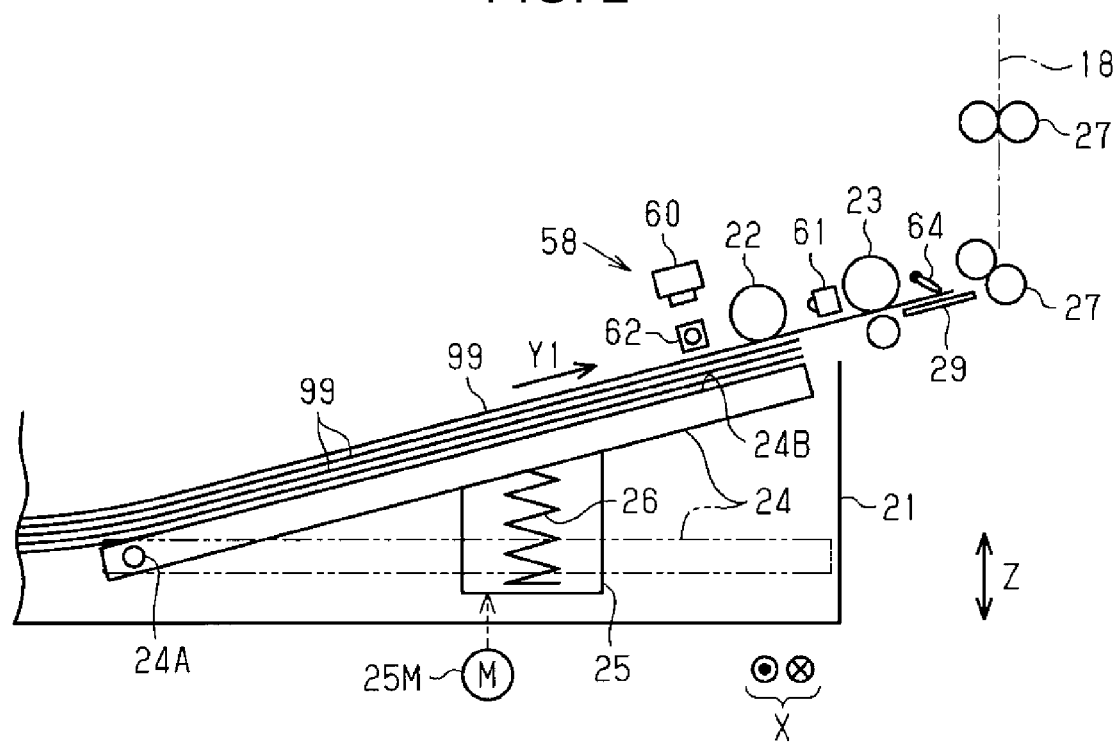
FIG. 2 is a schematic front view illustrating a feeding section.

As illustrated in FIG. 2, the recording apparatus 11 includes a surface information acquisition section 58 acquiring surface information of the recording medium 99 in the cassette 21 or the transporting path 18. In the example, the surface information acquisition section 58 is disposed at a periphery of a position slightly above the surface of the medium 99 accommodated in the cassette 21 in a state where the cassette 21 is inserted into the housing 12, and acquires the surface information of the medium 99 accommodated in the cassette 21. The surface information acquisition section 58 is disposed at the periphery of the position above the surface of the medium 99 facing the surface of the uppermost medium 99 among the media 99 on the hopper 24 when the hopper 24 is at the feeding position.

In the embodiment, the surface information acquisition section 58 includes a camera 60 and a plurality of light sources 61 and 62 as an example of a light receiving section and an imaging section. That is, the surface information acquisition section 58 includes the light sources 61 and 62 irradiating the surface of the recording medium 99 with light, and the camera 60 acquiring light reflected by the surface of the recording medium 99. The two light sources 61 and 62 irradiate an imaging area of the camera 60 on the medium 99 with the light. The surface information acquisition section 58 is disposed at a position at which the surface information of the medium 99 in a state of being stored in the cassette 21 can be acquired. Therefore, the camera 60 is disposed at a position at which imaging can be performed in a direction perpendicular to the surface of the uppermost medium 99 in a feeding posture, which abuts against the pickup roller 22 in the cassette 21. That is, an optical axis of the camera 60 is parallel to a direction perpendicular to the surface of the medium 99 of the feeding posture. In addition, the two light sources 61 and 62 obliquely irradiate the imaging area on the surface of the medium 99 of the feeding posture with light in two different directions. Light irradiation conditions of the two light sources 61 and 62, and the like will be described later.

In the embodiment, when the camera 60 images the surface of the medium 99 on the hopper 24, the following automatic focusing control can also be adopted. Since the hopper 24 is electrically driven, the control section 16 controls the position of the hopper 24 to a height position in focus on the surface of the uppermost medium 99. Specifically, when the control section 16 controls the position of the hopper 24 by controlling driving of the electric motor 25M of the hopper driving section 25, the control section 16 detects a position at which the contrast is the highest from contrast information of a captured image acquired from the camera 60 as the position in focus on the surface of the uppermost medium 99, and stops the hopper 24 at the image pickup position which is detected. Alternatively, the control section 16 may control driving of an electric motor (not illustrated) to adjust the height position of the camera 60 to be the position at which the contrast of the captured image acquired from the camera 60 becomes the highest. Therefore, the camera 60 can capture the image of the surface of the medium 99, which is focused on the surface of the uppermost medium 99.

In addition, in the transporting path 18, a medium thickness sensor 64, as an example of a thickness information acquisition section measuring a medium thickness that is a thickness of the medium 99, is provided in a region in the downstream from the separation roller 23. The medium thickness sensor 64 is disposed in the transporting path 18. The medium thickness sensor 64 of the example is a contact-type sensor measuring the medium thickness by coming into contact with the medium 99. The medium thickness sensor 64 is disposed in the downstream from the separation roller 23 in the transporting direction Y1 in order to cause the medium thickness sensor 64 to measure the thickness of the medium 99 separated into one sheet by the separation roller 23. For example, if the medium thickness sensor is provided in a region between the pickup roller 22 and the separation roller 23, there is a concern that a total thickness of the plurality of media 99 is erroneously measured as the medium thickness when the plurality of media 99 overlap and are fed out. In this regard, the medium thickness sensor 64 illustrated in FIG. 2 measures the thickness of the medium 99 after being separated into one sheet by the separation roller 23, so that erroneous measurement of the medium thickness due to overlap feeding can be prevented. A guide member 29 supporting the medium 99 is disposed at a position facing the medium thickness sensor 64 with the transporting path 18 interposed therebetween. The medium thickness sensor 64 measures the thickness of the medium 99 in a state of being supported on the guide member 29.

In the embodiment, since the medium thickness is acquired at a timing prior to the timing of printing, the medium 99 fed out to a predetermined position is not left as it is, but the medium thickness is measured and then the medium 99 is returned to the cassette 21. This is because the user may pull the cassette 21 out of the housing 12 to refill the cassette 21 with the medium 99 before and after printing. In this case, when the medium 99 is pinched by the separation roller 23, medium residue, in which the medium 99 remains on the housing 12 side, is generated. Therefore, the medium 99 is returned into the cassette 21 after the measurement of the medium thickness. For example, the medium 99 can be returned to the cassette 21 by rotating the separation roller 23 in a reverse direction and rotating the medium 99 in a returning direction to the cassette 21.

Figure 3:
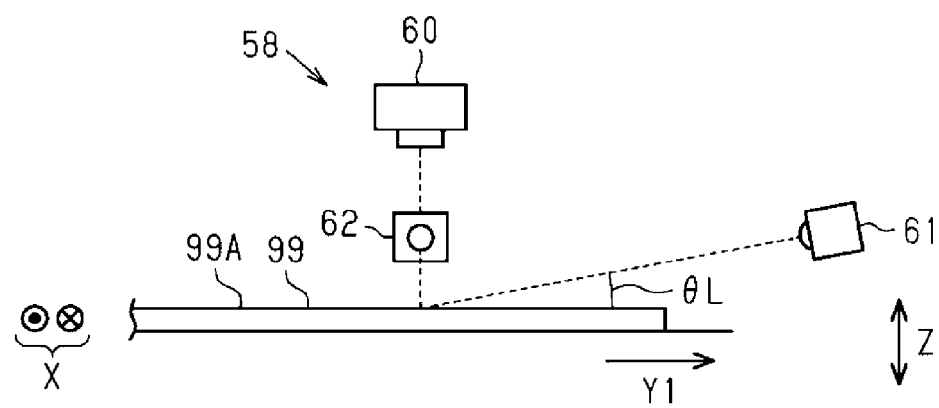
FIG. 3 is a schematic side view illustrating a surface information acquisition section.

Next, a positional relationship between the camera 60 and the two light sources will be described with reference to FIGS. 3 and 4. FIG. 3 is a view of the uppermost medium 99 when the hopper 24 in FIG. 2 moves upward as viewed in a direction parallel to the transporting direction Y1 parallel to the surface of the uppermost medium 99. In addition, similarly, FIG. 4 is a view of the uppermost medium 99 in FIG. 2 as viewed in a direction perpendicular to the surface of the uppermost medium 99.

Figure 4:
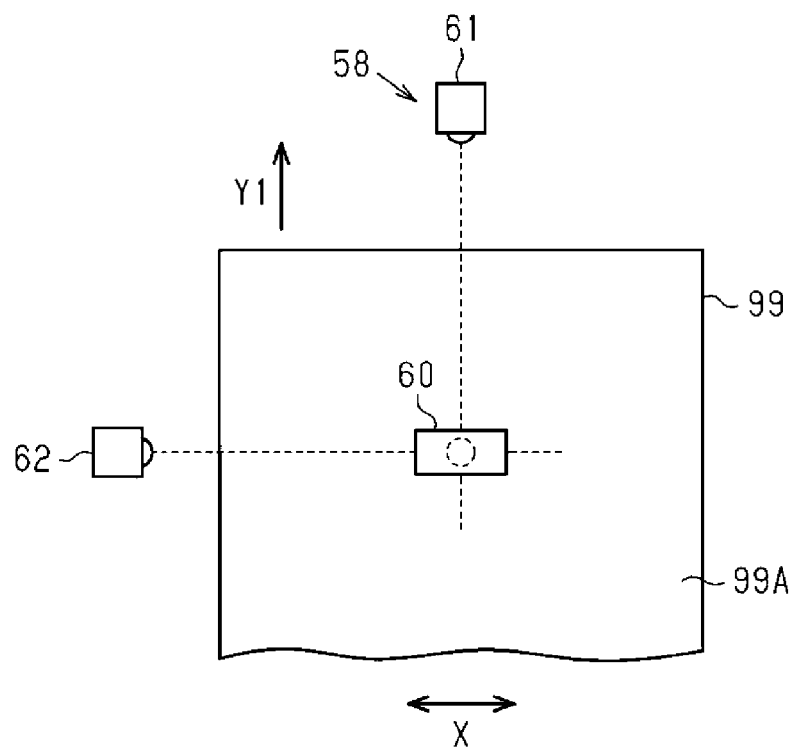
FIG. 4 is a schematic plan view illustrating the surface information acquisition section.

As illustrated in FIGS. 3 and 4, in the surface information acquisition section 58, two light sources are configured of the first light source 61 of which an optical axis is directed in a direction (hereinafter, referred to as a "first direction") along the transporting direction Y1 that is a direction in which the medium 99 is fed out when the medium 99 of the feeding posture is fed, and the second light source 62 of which an optical axis is directed in a direction (hereinafter, referred to as a "second direction") along the width direction X intersecting the transporting direction Y1. The first light source 61 and the second light source 62 obliquely irradiate a surface 99A of the medium 99 with the light. The first light source 61 and the second light source 62 are, for example, LEDs. In the example, as the light sources 61 and 62, blue LEDs are used. The first light source 61 is disposed at a position separated from the surface 99A of the medium 99 by a predetermined separated distance in a direction perpendicular to the surface 99A of the medium 99 from a position separated from the imaging area of the camera 60 by a predetermined distance in a direction parallel to the transporting direction Y1. In addition, the second light source 62 is disposed at a position separated from the surface 99A of the medium 99 by a predetermined separated distance in a direction perpendicular to the surface 99A of the medium 99 from a position separated from the imaging area of the camera 60 by a predetermined distance in the width direction X intersecting the transporting direction Y1. The first light source 61 irradiates the imaging area of the medium 99 with the light at an irradiation angle θL in the direction along the transporting direction Y1. In addition, the second light source 62 irradiates the imaging area of the medium 99 with the light at the irradiation angle θL in the direction along the width direction X. The irradiation angle θL is the same for the two light sources 61 and 62. The light sources 61 and 62 are not limited to the LEDs, and may be light bulbs, fluorescent lamps, xenon lamps, or the like.

As illustrated in FIGS. 3 and 4, the camera 60 receives light from a normal direction of the medium 99 at a position intersecting the optical axis of the first light source 61 and the optical axis of the second light source 62. The camera 60 captures an image of the surface 99A of the medium 99 in the feeding posture in a direction perpendicular to the surface of the medium 99. The camera 60 is disposed at a position at which a distance to the surface 99A of the medium 99 in the feeding posture is a focal length. The camera 60 sets a part of the surface 99A of the medium 99 as the imaging area. If the camera 60 is configured to focus on the surface 99A of the medium 99 by position control of the hopper 24, for example, a distance slightly longer than the distance to the surface 99A of the medium 99 in the feeding posture is disposed at the position which is the focal length of the camera 60. In this case, in the process of the upward movement from the retracted position to the feeding position of the hopper 24 by driving the electric motor 25M, the camera 60 images the medium 99 at the position in focus on the surface 99A.

Microscopic unevenness is present on the surface of the medium 99 due to paper fiber which is a material of the medium 99. A form of the unevenness varies due to a form and a size of the paper fiber. In addition, the form of the unevenness of the surface of the medium 99 subjected to surface treatment such as application of a coat layer on the surface varies from that of the medium 99 not subjected to the surface treatment. A shade is formed on the unevenness of the surface of the medium 99 in the imaging area by irradiating the surface 99A of the medium 99 with the light from the two light sources 61 and 62. That is, a slope of a ridge on the unevenness surface of the medium 99, on which the light hits, is bright, and the slope of the ridge and a valley on which the light does not hit are dark. Therefore, the surface of the medium 99 can be bright or dark due to the microscopic unevenness. The contrast due to the microscopic unevenness varies depending on the type of the medium 99 (hereinafter, referred to as a "medium type").

In addition, the medium 99 has a directionality in which the fibers are aligned in a predetermined direction caused by a manufacturing method. Therefore, the medium 99 has vertical markings and horizontal markings due to the directionality of the fibers. Therefore, when the surface 99A of the medium 99 is irradiated with the light in the first direction and the second direction different from each other, a difference occurs in an appearance of the shade due to the unevenness of the surface of the medium 99. The difference in the appearance of the shade of the unevenness between the vertical markings and the horizontal markings varies depending on the type of the medium. Therefore, the two light sources 61 and 62 are switched to switch the irradiation direction of the light to the surface 99A of the medium 99. The first light source 61 and the second light source 62 sequentially emit light and the camera 60 respectively receives the light. Therefore, the camera 60 acquires a captured image of the surface 99A of the medium 99 when irradiating with the light in the first direction, and a captured image of the surface 99A of the medium 99 when irradiating with the light in the second direction.

Figure 5:
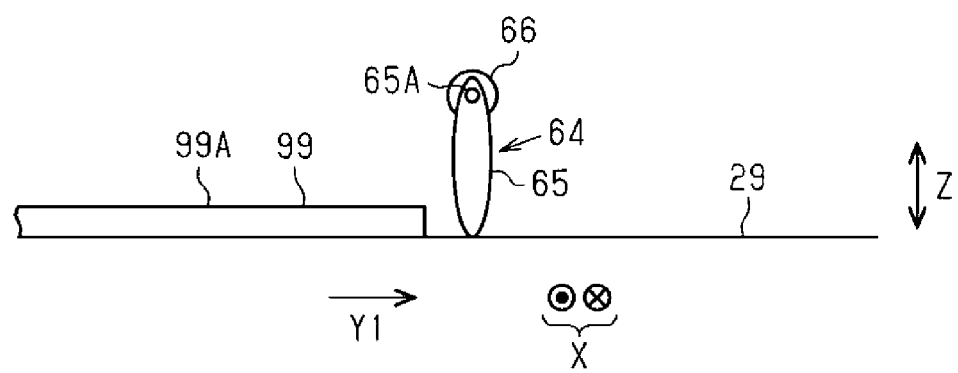
FIG. 5 is a schematic front view illustrating a medium thickness sensor.
Figure 6:
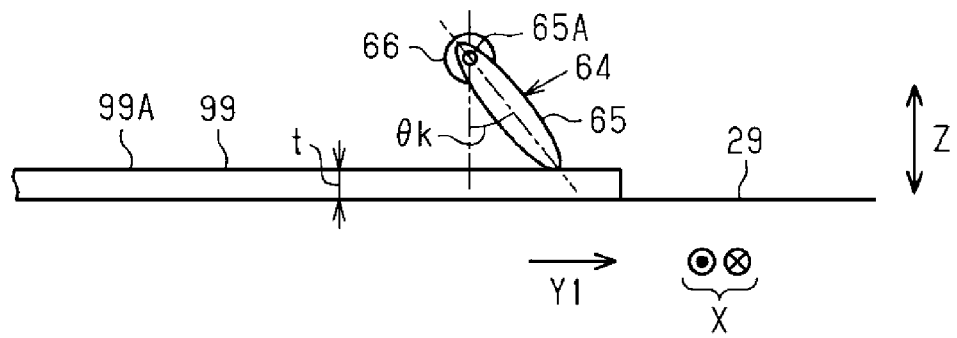
FIG. 6 is a schematic front view illustrating a state where the medium thickness sensor detects a medium thickness.

Next, the medium thickness sensor 64 will be described with reference to FIGS. 5 and 6. The medium thickness sensor 64 is, for example, the contact-type sensor. As illustrated in FIGS. 5 and 6, the medium thickness sensor 64 includes a lever 65 which can be tilted around a pin 65A, and an angle sensor 66 measuring a tilt angle of the lever 65. The angle sensor 66 can use a potentiometer, a rotary encoder, or the like. Moreover, the medium thickness sensor may be an optical sensor.

As illustrated in FIG. 5, in the medium thickness sensor 64, in a state where the medium 99 is not present, the lever 65 is disposed at a standby position by its own weight. A reference angle, which is a tilt angle when the lever 65 is in the standby position, is for example, 0 degree. As illustrated in FIG. 6, the medium 99 transported in the transporting direction Y1 presses the lever 65, so that the lever 65 is tilted at a tilt angle θk according to a thickness t of the medium 99. In this case, a back surface of the medium 99 is supported by the guide member 29 and, under this state, the lever 65 is placed on the medium 99, and the weight of the lever 65 is applied to the medium 99. The tilt angle θk of the lever 65 has a one-to-one correspondence relationship with the thickness t of the medium 99. The medium thickness sensor 64 measures the thickness t of the medium 99 from the tilt angle θk of the lever 65.

Next, an electric configuration of the recording apparatus 11 will be described with reference to FIG. 7. The recording apparatus 11 includes the control section 16 integrally controlling the recording apparatus 11. The control section 16 is electrically coupled to the operation section 56 and the display section 57 constituting the operation panel 55. In addition, the control section 16 is electrically coupled to the recording head 40, the feeding section 13, the hopper driving section 25, and the transport section 14 used for printing onto the medium 99. Specifically, the control section 16 is electrically coupled to a feeding motor (not illustrated) constituting the feeding section 13. The feeding motor rotates forward, so that the pickup roller 22 and the separation roller 23 rotate forward in a direction to feed the medium 99 in the transporting direction Y1. In addition, in the example, the feeding motor can also be reversely driven and is reversely driven, so that the pickup roller 22 and the separation roller 23 reverse the medium 99 so as to be reversely transported in a direction opposite to the transporting direction Y1. In addition, the control section 16 is electrically coupled to the electric motor 25M constituting the hopper driving section 25. The control section 16 controls driving of the electric motor 25M to perform control of focusing when the camera 60 images the surface 99A of the medium 99. Furthermore, the control section 16 is electrically coupled to a plurality of transport motors and belt driving motors (not illustrated) constituting the transport section 14. The control section 16 controls those motors to drive the transport roller 31 and the belt-type transport section 32, and control the transport of the medium 99 during printing. The control section 16 controls those motors to transport the medium 99 at a constant transport speed along the transporting path 18. The control section 16 controls the recording head 40 formed of, for example, a line head and discharges ink droplets from the nozzle 41 to record an image onto the surface 99A of the medium 99 transported at a constant transport speed.

In addition, the control section 16 is electrically coupled to the camera 60, the first light source 61, and the second light source 62 constituting the surface information acquisition section 58. The control section 16 controls the camera 60 to perform an imaging operation when it is time to determine a predetermined medium type. In addition, when it is time to determine the medium type, the control section 16 switches lighting of the first light source 61 and the second light source 62. The captured image of the surface 99A of the medium 99 irradiated with the light by the first light source 61 in the first direction, and the captured image of the surface 99A of the medium 99 irradiated with the light by the second light source 62 in the second direction are imaged by the camera 60. Furthermore, the control section 16 is electrically coupled to the medium thickness sensor 64. The control section 16, when it is time to determine the medium type, drives the feeding section 13 to transport the medium 99 from the cassette 21 to a thickness measurement position illustrated in FIG. 6. The control section 16 acquires the thickness t of the medium 99 based on information of the tilt angle θk acquired from the medium thickness sensor 64 when the medium is at the thickness measurement position. In addition, the control section 16 is electrically coupled to a cassette sensor 68 as an example of a detecting section detecting that the cassette 21 is inserted. The cassette sensor 68 detects that the cassette 21 is in the inserted state and is in a non-detection state when the cassette 21 is not in the inserted state. The cassette sensor 68 detects that the cassette 21 once removed from the housing 12 is inserted into the housing 12. The control section 16 sets the time when the cassette sensor 68 is switched from the non-detection state to the detection state and the cassette 21 is inserted, as the medium type determination time. The control section 16 executes a medium type determination process when it is the medium type determination time. That is, at the timing when the cassette 21 is inserted, the medium thickness sensor 64 acquires the thickness information, the surface information acquisition section 58 acquires the surface information, and the control section 16 determines the medium type which is the type of the medium 99 in the cassette 21 based on the thickness information and the surface information.

Figure 7:
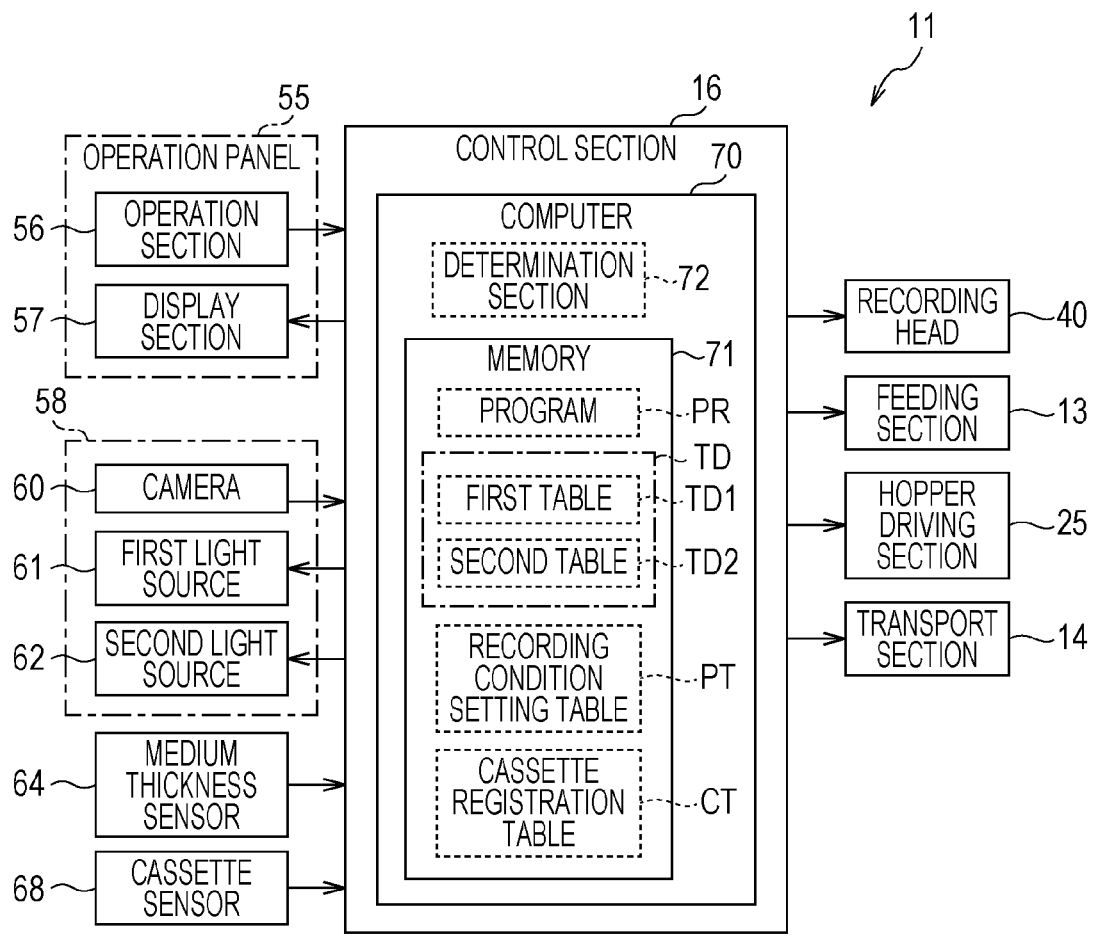
FIG. 7 is a block diagram illustrating an electric configuration of the recording apparatus.
Figure 15:
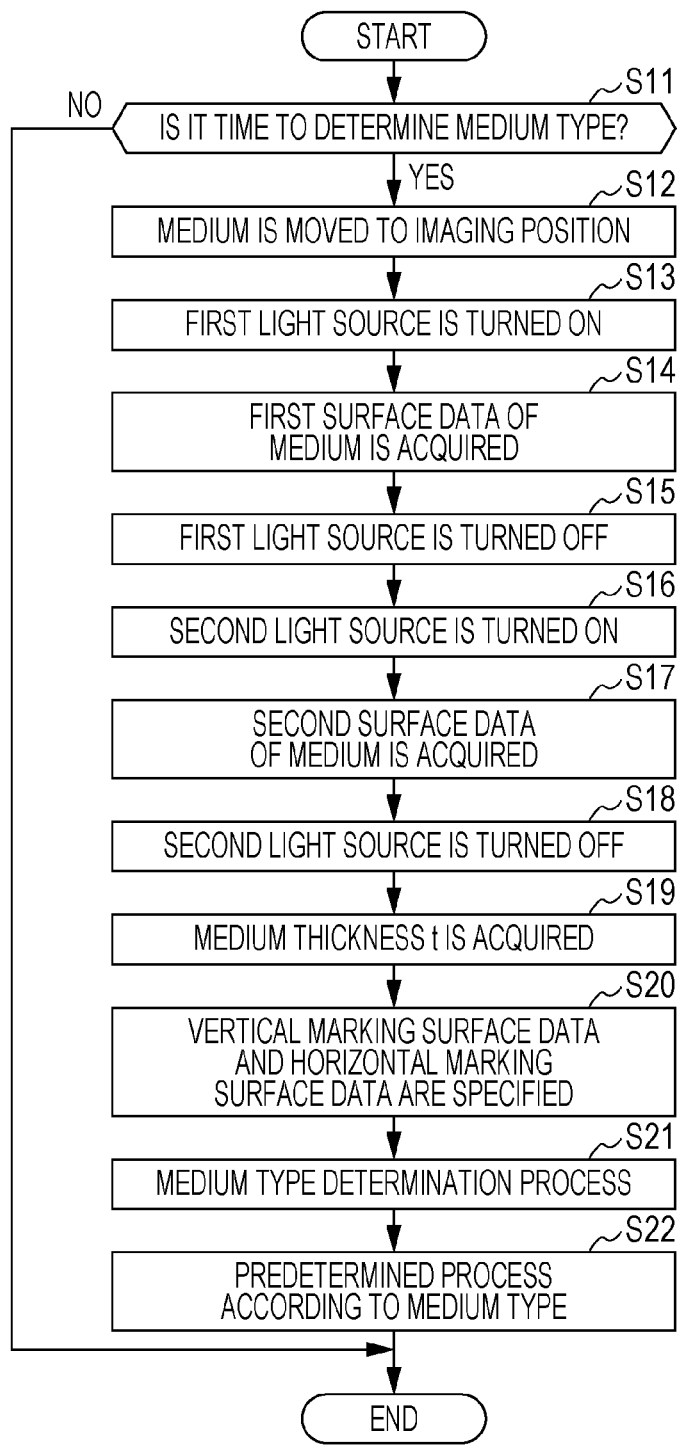
FIG. 15 is a flowchart illustrating medium type determination control.
Figure 16:
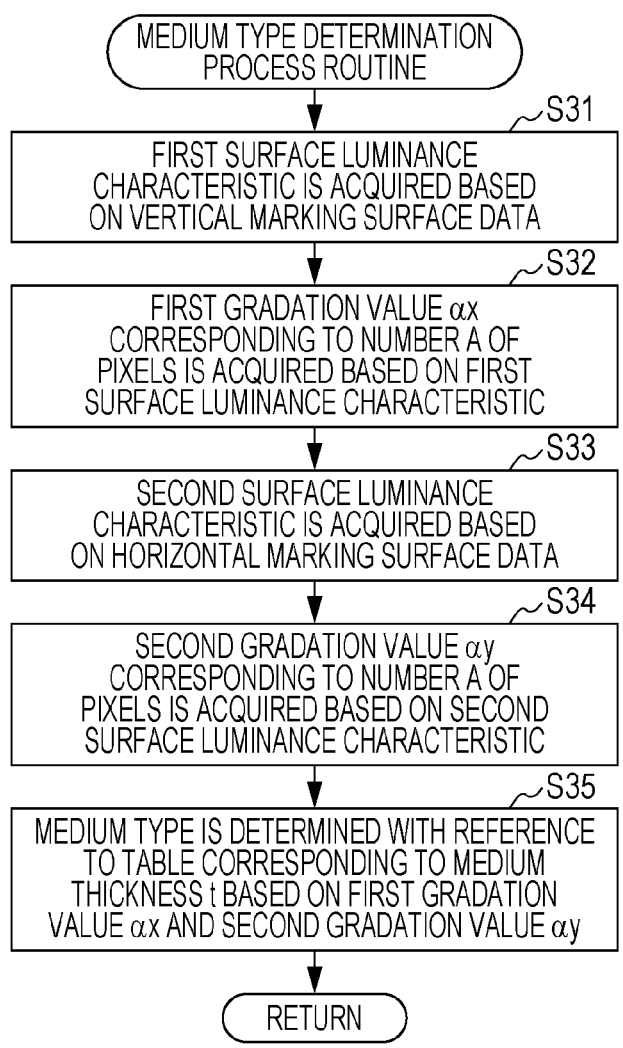
FIG. 16 is a flowchart illustrating a medium type determination processing routine.

As illustrated in FIG. 7, the control section 16 includes a computer 70. The computer 70 includes a memory 71. The memory 71 stores a program PR, table data TD, a recording condition setting table PT, and a cassette registration table CT. The program PR includes a program to be executed by the computer 70 when medium type determination controls illustrated in flowcharts of FIGS. 15 and 16 are performed. The computer 70 executes the program PR read from the memory 71 to perform the printing control and the medium type determination control. The control section 16 includes a determination section 72 formed of software configured by the computer 70 executing the programs illustrated in FIGS. 15 and 16.

Table data TD is reference data referred to when the computer 70 determines the medium type. Table data TD includes a first table TD1 and a second table TD2 described later.

In addition, the recording condition setting table PT is a table indicating a correspondence relationship between the medium type and the recording conditions. Here, the recording conditions are conditions for determining the print mode defining print quality and the print speed. That is, the recording condition setting table PT is referred to by the computer 70 when the corresponding print mode is determined from the medium type. The medium type includes, for example, a plain paper A, a plain paper B, a dedicated paper A, a dedicated paper B, and the like. In addition, the print mode includes a plurality of modes including a standard print mode and a high definition print mode. The standard print mode is a print mode in which a printing speed has priority over print quality. In addition, the high definition print mode is a print mode in which print quality has priority over the printing speed. In the recording condition setting table PT, the standard print mode is set for the medium type belonging to the plain paper such as the plain paper A and the plain paper B. In addition, in the recording condition setting table PT, the high definition print mode is set for the medium type belonging to the dedicated paper such as the dedicated paper A and the dedicated paper B.

Furthermore, the cassette registration table CT is a setting table in which the medium type of the medium 99 accommodated in the cassette 21 is associated with the cassette 21 in which the medium 99 of the medium type is accommodated. In the cassette registration table CT, a correspondence relationship between the medium type and the cassette 21 registered by an operation of the operation section 56 by the user is registered. In the example, it is also possible to automatically set the registration by the control section 16 instead of the user. In this case, when the control section 16 detects that the cassette 21 is inserted into the housing 12 by a detection signal of the cassette sensor 68, the medium type obtained by executing the medium type determination process and the cassette 21 in which the medium 99 of the medium type is accommodated are associated with each other, and registered in the cassette registration table CT.

Figure 8:
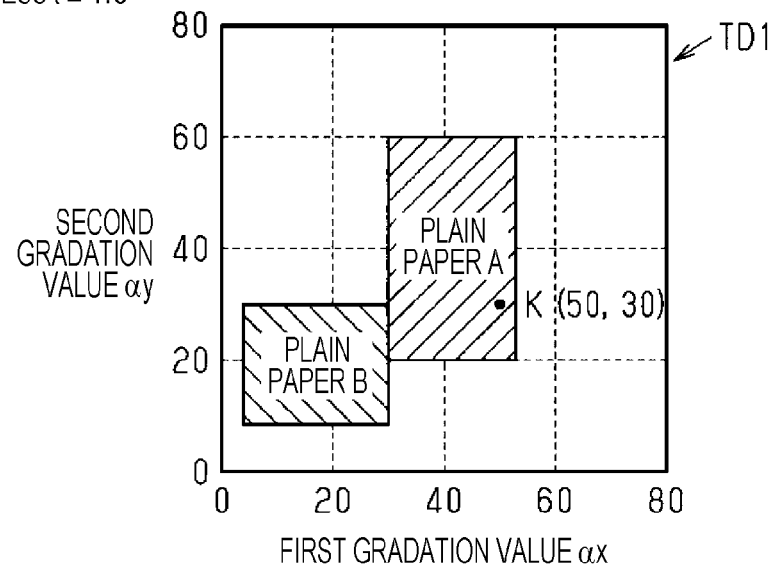
FIG. 8 is a schematic view illustrating a first table.
Figure 9:
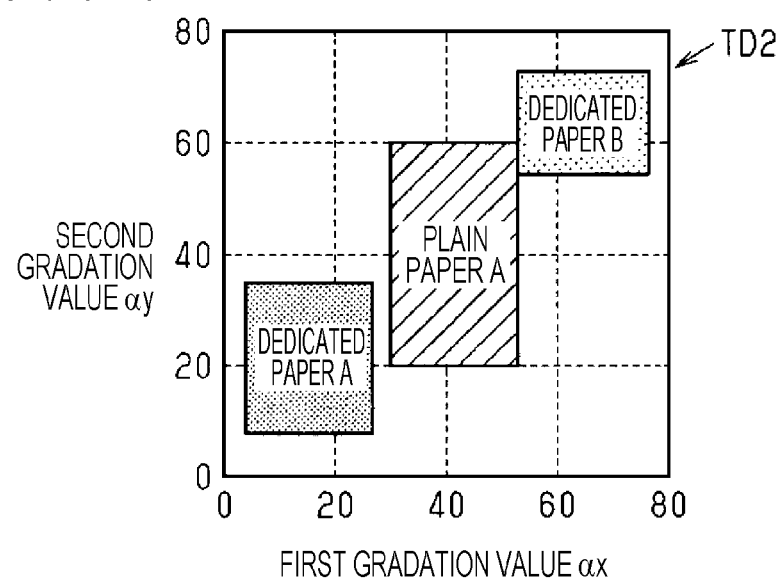
FIG. 9 is a schematic view illustrating a second table.

Next, details of table data TD will be described with reference to FIGS. 8 and 9. The table data TD includes, for each thickness of the medium 99, the first table TD1 illustrated in FIG. 8 and the second table TD2 illustrated in FIG. 9. As illustrated in FIGS. 8 and 9, as an example, the medium 99 is a sheet and as the medium type, there are the "plain paper A", the "plain paper B", the "dedicated paper A", the "dedicated paper B", and the like. The first table TD1 is a table referred to when the paper thickness t of the medium 99 is 1.0 mm or less, and the second table TD2 is a table referred to when the paper thickness t of the medium 99 exceeds 1.0 mm and 2.0 mm or less. The determination section 72 of the control section 16 selects one of the first table TD1 and the second table TD2 according to the paper thickness which is the medium thickness measured by the medium thickness sensor 64.

As illustrated in FIGS. 8 and 9, in the first table TD1 and the second table TD2, a horizontal axis indicates a first gradation value $\alpha x$ obtained from the captured image of the surface 99A of the medium 99 when irradiating with the light in the first direction, and a vertical axis indicates a second gradation value $\alpha y$ obtained from the captured image of the surface 99A of the medium 99 when irradiating with the light in the second direction. The computer 70 analyzes the captured images of two types obtained by imaging the surface 99A of the medium 99 from the camera 60 in different light irradiation directions of the first direction and the second direction. According to the analysis, the computer 70 acquires the first gradation value $\alpha x$ representing surface luminance characteristics based on the captured image in which the shade due to the unevenness of the fibers of the surface 99A is reflected when obliquely irradiating with the light in the first direction along the vertical markings of the medium 99. In addition, the computer 70 acquires the second gradation value $\alpha y$ representing surface luminance characteristics based on the captured image in which the shade due to the unevenness of the fibers of the surface 99A is reflected when obliquely irradiating with the light in the second direction along the horizontal markings of the medium 99. The first gradation value $\alpha x$ is first surface information about the vertical markings representing characteristics of the vertical markings on the surface 99A of the medium 99, and the second gradation value $\alpha y$ is second surface information about the horizontal markings representing characteristics of the horizontal markings on the surface 99A of the medium 99.

The computer 70 specifies the medium type by referring to one of the first table TD1 and the second table TD2 according to the paper thickness t, based on the first gradation value $\alpha x$ and the second gradation value $\alpha y$. Here, in the first table TD1 and the second table TD2, the horizontal axis is the first gradation value $\alpha x$ representing the surface luminance characteristics of the vertical markings of the medium 99, and the vertical axis is the second gradation value $\alpha y$ representing the surface luminance characteristics of the horizontal markings of the medium 99. Therefore, the tables TD1 and TD2 both have a table for the vertical markings representing the correspondence relationship between the first gradation value $\alpha x$ representing the surface luminance characteristics of the vertical markings and the medium type, and a table for the horizontal markings representing the correspondence relationship between the second gradation value $\alpha y$ representing the surface luminance characteristics of the horizontal markings and the medium type.

The determination section 72 narrows down the types of the media 99 based on one of the thickness information and the surface information, and specifies the type of the medium 99 based on the other from the narrowed types of the media 99. First, the determination section 72 of the embodiment narrows down the types of the media 99 based on the thickness information, and specifies the type of the medium 99 based on the surface information from the narrowed types of the media. Specifically, first, the determination section 72 narrows down, based on the paper thickness t that is the thickness information, the medium types that are the types of the media 99 by selecting one of the two tables TD1 and TD2 illustrated in FIGS. 8 and 9. The medium type is specified, based on the first gradation value αx and the second gradation value αy which are the surface information, from the narrowed medium types belonging to one of the tables TD1 and TD2. For example, coordinates (αx, αy)=(50, 30) of a point K illustrated in FIG. 8 is obtained as the surface information in which the paper thickness t that is the thickness information is 1.0 mm or less. In the example, the first table TD1 is selected from the paper thickness information in which the paper thickness t is 1.0 mm or less, so that it is narrowed down to the "plain paper A" and the "plain paper B" which are the medium types belonging to the first table TD1. The "plain paper A" is specified as the medium type, based on the surface information (αx, αy)=(50, 30), from the "plain paper A" and the "plain paper B" which are the narrowed medium types belonging to the first table TD1.

As described above, the determination section 72 narrows down the medium types belonging to the first table TD1 illustrated in FIG. 8 based on the thickness information in which the paper thickness t is 1.0 mm or less (t≤1.0), and specifies the medium type based on the surface information (αx, αy) from the narrowed medium types. In addition, first, the determination section 72 narrows down the medium types bonding the second table TD2 illustrated in FIG. 9 based on the thickness information in which the paper thickness t exceeds 1.0 mm and 2.0 mm or less (1.0<t≤2.0). That is, it is narrowed down to the "plain paper A", the "dedicated paper A", and the "dedicated paper B" which are the medium types belonging to the second table TD2 illustrated in FIG. 9. The medium type is specified, based on the surface information (αx, αy), from the "plain paper A", the "dedicated paper A", and the "dedicated paper B" which are the narrowed medium types belonging to the second table TD2. Moreover, in the example, the medium thickness is divided into two ranges, but may be divided into three ranges or more.

Figure 10:
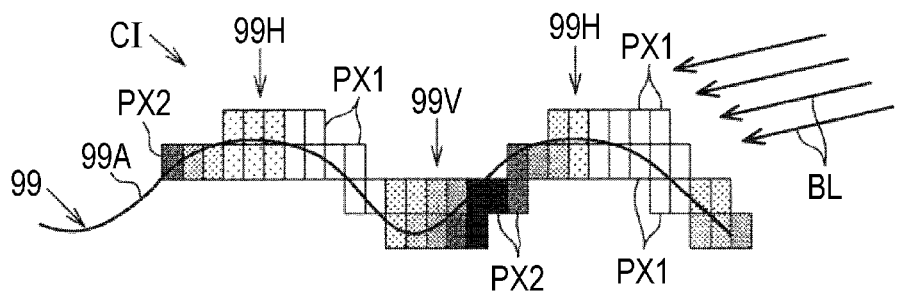
FIG. 10 is a schematic view for explaining a surface captured image.
Figure 11:
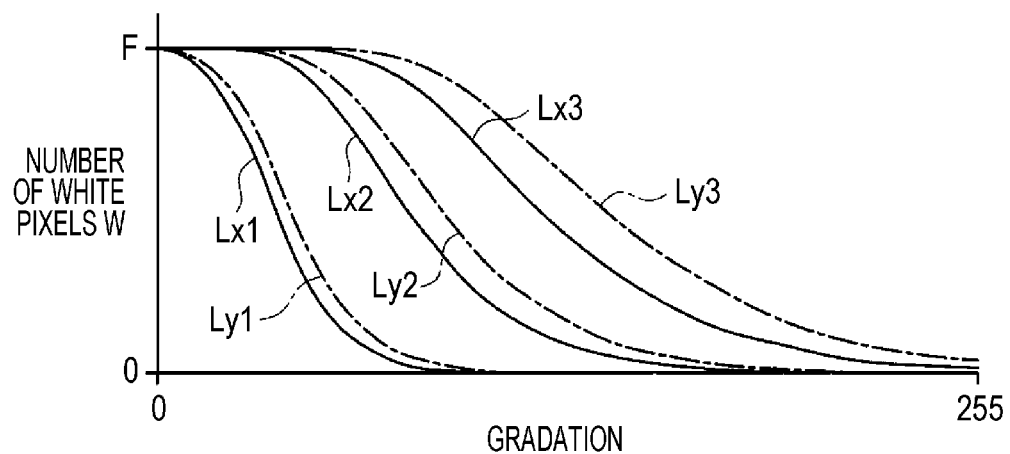
FIG. 11 is a graph illustrating surface luminance characteristics represented by gradation and the number of white pixels on a dedicated paper.
Figure 12:
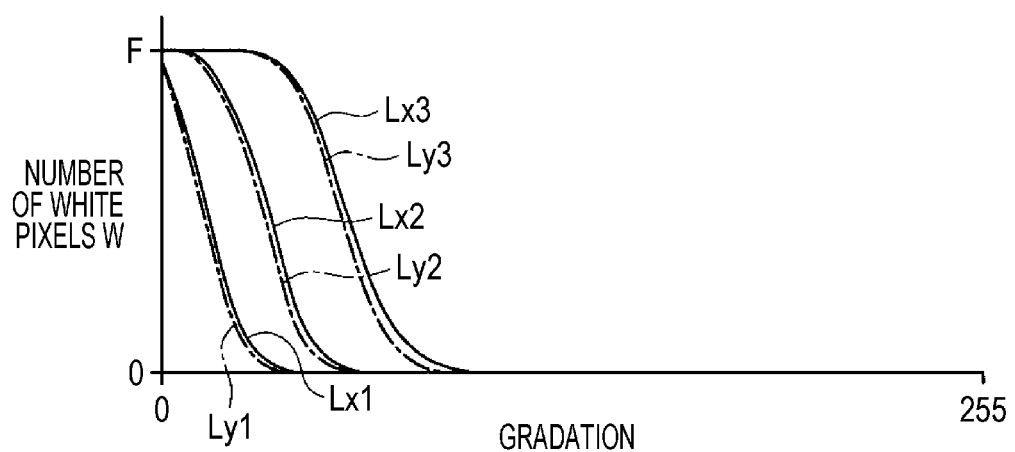
FIG. 12 is a graph illustrating surface luminance characteristics represented by gradation and the number of white pixels on a dedicated paper.
Figure 13:
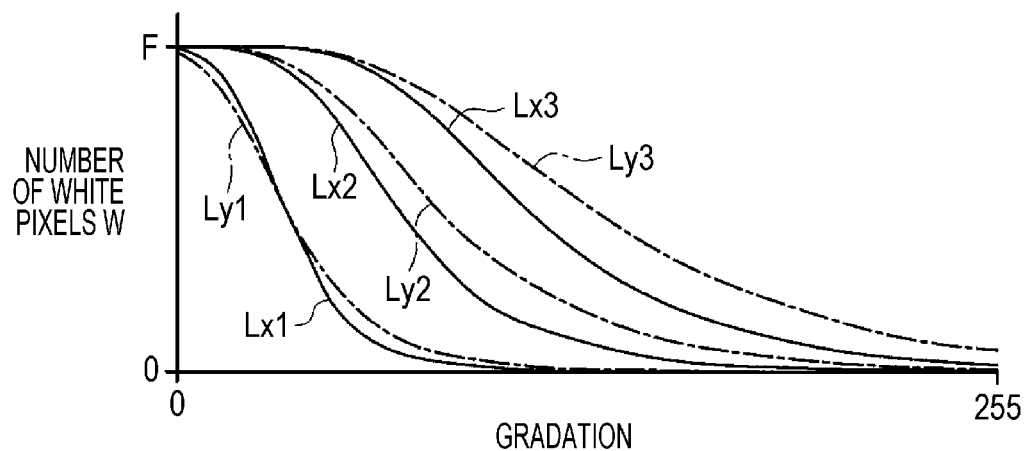
FIG. 13 is a graph illustrating surface luminance characteristics represented by gradation and the number of white pixels on a plain paper.

Next, a creation method of the table data TD will be described with reference to FIGS. 10 to 13. Graphs illustrated in FIGS. 11 to 13 illustrate the surface luminance characteristics representing a relationship between a luminance per unit area and the number of pixels for a vertical marking image when the light irradiation direction is the first direction along the vertical markings and a horizontal marking image captured by the camera 60 when the light irradiation direction is the second direction along the horizontal markings. The two light sources 61 and 62 had light intensities of 20%, 40%, and 60%. Three types of the vertical marking images were obtained by obliquely irradiating the surface of the medium 99 by the first light source 61 with the light in the first direction along the vertical markings at the light intensities of 20%, 40%, and 60%. In addition, three types of the horizontal marking images were obtained by obliquely irradiating the surface of the medium 99 by the second light source 62 with the light in the second direction along the horizontal markings at the light intensities of 20%, 40%, and 60%.

The medium types can be roughly divided into the "plain paper" and the "dedicated paper". Furthermore, the plain paper is divided into a plurality of types according to applications for business use, general use, and the like, and production countries. Here, as an example, the plain paper is divided into the "plain paper A" and the "plain paper B". In addition, the dedicated paper is divided into types such as "glossy paper", "photo paper", and "super fine paper". Here, as an example, the dedicated paper is divided into the "dedicated paper A" and the "dedicated paper B". The dedicated paper A is "super fine paper" and the dedicated paper B is "glossy paper". The graph of FIG. 11 illustrates the surface luminance characteristics of the "super fine paper" that is the "dedicated paper A". The graph of FIG. 12 illustrates the surface luminance characteristics of the "glossy paper" that is the "dedicated paper B". Furthermore, the graph of FIG. 13 illustrates the surface luminance characteristics of the "plain paper A". In the example, in order to simplify the description, the medium types are four types of the "plain paper A", the "plain paper B", the "dedicated paper A", and the "dedicated paper B".

Here, the captured image obtained by imaging the surface 99A of the medium 99 including fine unevenness will be described with reference to FIG. 10. FIG. 10 is a schematic view of the surface 99A of the medium 99 as viewed slightly obliquely in order to express the fine unevenness of the surface 99A. As illustrated in FIG. 10, the shade due to the fine unevenness appears on the surface 99A of the medium 99 in the captured image CI. That is, as illustrated in FIG. 10, the surface 99A of the medium 99 in the captured image CI has the fine unevenness including a ridge 99H and a valley 99V. The surface 99A of the medium 99 is obliquely irradiated with light BL in the first direction and the second direction. The light BL is, for example, blue light. As illustrated in FIG. 10, a portion of a slope of the ridge 99H irradiated with the light BL is bright and a pixel PX1 having a high gradation value of the luminance is distributed. In addition, a slope of the ridge 99H on a side opposite to the irradiation direction of the light BL, and the valley 99V are dark as a shade, and a pixel PX2 having a low gradation value of the luminance is distributed. In addition, since a proportion of specular reflection of the light BL is high if the surface 99A of the glossy paper or the like is smooth, an amount of the received light of the camera 60 is relatively small, resulting in a dark image. On the contrary, since the reflected light of the light BL is diffused light on the surface 99A having unevenness, the amount of the received light of the camera 60 is relatively large, resulting in a bright image. As described above, a ratio of the number of the bright pixels PX1 and the number of the dark pixels PX2 in the captured image CI changes according to the type of the medium 99 such as a form and a size of the unevenness, and smoothness of the surface. In addition, a difference in the vertical markings and the horizontal markings of the surface 99A also affects the ratio of the number of the bright pixels PX1 and the number of the dark pixels PX2 in the captured image CI. Furthermore, the intensity of the light BL with which the surface 99A is irradiated also affects the ratio of the number of the bright pixels PX1 and the number of the dark pixels PX2. Moreover, in the example, the pixel has a luminance of gradation values of 0 to 255.

Here, a total number of pixels F per unit area in the captured image CI is, for example, M×N in which M is the number of vertical pixels and N is the number of horizontal pixels. A captured image of a unit area configured with F pixels is binarized by sequentially changing a threshold of the luminance from 0 to 255 by "1". The vehicle axis is the number W of white pixels in the obtained binarized 256 images, and the horizontal axis is the gradation value of the luminance used as the threshold. Graphs of the surface luminance characteristics illustrated in FIGS. 11 to 13 are respectively obtained by plotting three types of the vertical marking images and three types of the horizontal marking images different in the light intensity in the luminance. In each of the graphs of FIGS. 11 to 13, a curve Lx1 indicates a surface luminance characteristic of the vertical marking image with the light intensity of 20%, and a curve Ly1 indicates a surface luminance characteristic of the horizontal marking image with the light intensity of 20%. In addition, a curve Lx2 indicates a surface luminance characteristic of a vertical marking image with the light intensity of 40%, and a curve Ly2 indicates a surface luminance characteristic of a horizontal marking image with the light intensity of 40%. Furthermore, a curve Lx3 indicates a surface luminance characteristic of a vertical marking image with the light intensity of 60%, and a curve Ly3 indicates a surface luminance characteristic of a horizontal marking image with the light intensity of 60%. Moreover, although illustration is omitted in addition to the graphs illustrated in FIGS. 11 to 13, the same process is performed on the plain paper B to acquire the surface luminance characteristics.

Figure 14:
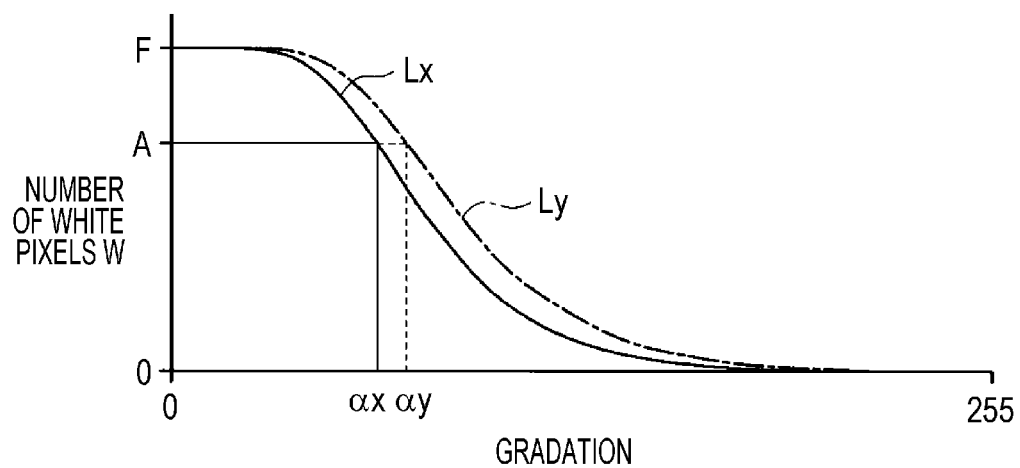
FIG. 14 is a graph for explaining how to obtain a first gradation value and a second gradation value.

The number A of white pixels capable of optimally distinguishing a plurality of medium types based on the curves Lx1, Ly1, . . . , and Ly3 of the surface luminance characteristics for each medium type illustrated in the graphs of FIGS. 11 to 13 is specified as a reference value used for the determination of the medium type. In other words, as illustrated in FIG. 14, the first gradation value αx and the second gradation value αy corresponding to the number A of white pixels, which is a temporary reference value, are determined from respective curves Lx and Ly of the surface luminance characteristics of the plurality of different medium types. The same process is performed by changing the value of the number A of white pixels which is the temporary reference value. The corresponding number of white pixels, when the first gradation value αx and the second gradation value αy of each medium type become values capable of optimally distinguishing the medium types, is determined to be "A". Thus, when the number A of white pixels is determined, an allowable range of the surface information (αx, αy) is determined for each of the plurality of medium types. The allowable range of the surface information (αx, αy) for each medium type, which can be taken as a table, is a range of allowable surface information (αx, αy) for each medium type when FIGS. 8 and 9 are combined into one table. However, as illustrated in FIGS. 8 and 9, the "plain paper B" and the "dedicated paper A" cannot be distinguished only by the surface information (αx, αy). Therefore, in the embodiment, the medium types are determined based on the thickness information t and the surface information (αx, αy) in consideration of the difference in the thickness information between the "plain paper B" and the "dedicated paper A". Therefore, in the examples illustrated in FIGS. 8 and 9, the first table TD1 and the second table TD2 divided by the thickness information and the range of the paper thickness t are used.

In addition, for the medium 99 having different surface states on both sides, the surface luminance characteristics are obtained for both the front and back surfaces, and each range of surface information for specifying the front surface and surface information for specifying the back surface is set in each of the tables TD1 and TD2. For example, if the medium 99 is the "glossy paper", the surface information of the front surface and the surface information of the back surface are included in the second table TD2. The memory 71 stores a value of the number A of white pixels as the reference value for determination in addition to the first table TD1 and the second table TD2. Moreover, in the example, although the gradation value of the pixel is 255 gradations, when the number of gradations is small, determination accuracy tends to be low, and when the number of gradations is large, a storage capacity required for the memory 71 and a processing load of the computer 70 increase. Therefore, the number of gradations can be selected as an appropriate value capable of determining the medium type according to the number of medium types to be determined by the recording apparatus 11. The number of gradations may be, for example, other number of gradations such as 16 gradations, 32 gradations, 64 gradations, and 1024 gradations.

In addition, in the embodiment, the control section 16 performs calibration of the surface information acquisition section 58 regularly or irregularly. A reference surface 24B illustrated in FIG. 2 is provided on the surface of the hopper 24 facing the camera 60. The reference surface 24B is, for example, a white reference surface. In a state where the medium 99 is not placed on the hopper 24, the control section 16 performs calibration to individually adjust light emission intensities of the light sources 61 and 62 based on the light receiving amount of the light, which is emitted from the light sources 61 and 62 and reflected by the reference surface 24B, received by the camera 60. For example, the recording apparatus 11 initially sets the light intensities of the light sources 61 and 62, so that the light receiving amount falls within an appropriate range based on the light receiving amount of the light from the light sources 61 and 62, which is reflected by the reference surface 24B, received by the camera 60. The memory 71 stores a setting value of the light receiving amount for each of the light sources 61 and 62 which are initially set. The control section 16 performs the calibration of the light sources 61 and 62 in a state where the cassette 21 is out of medium, the medium 99 is not placed on the hopper 24, and the reference surface 24B is exposed. In the calibration, the light sources 61 and 62 are sequentially turned on one by one. The camera 60 images the reference surface 24B when the light sources 61 and 62 are turned on one by one and the light from the reference surface 24B is received. The control section 16 compares the light receiving amount for each of the light sources 61 and 62 acquired from the camera 60 with the setting value of the light receiving amount at the time of the initial setting read from the memory 71, adjusts a supply voltage to the light sources 61 and 62 as necessary, and adjusts the light emission intensities of the light sources 61 and 62, so that a current light receiving amount falls in a difference within the allowable range with respect to the setting value. Therefore, when the camera 60 captures an image of the reference surface 24B, the luminance adjustment, in which a constant light amount is obtained, is performed. Therefore, an influence of paper dust or ink mist attached to the light sources 61 and 62, an influence of aging of the light sources 61 and 62, or the like can be suppressed. The control section 16 can appropriately determine the type of the medium 99 under appropriate illumination conditions.

Next, an operation of the recording apparatus 11 will be described.

In the embodiment, the type of the medium 99 is registered in advance for each cassette 21, and is stored in the memory 71 as the cassette registration table CT. The user replaces the medium 99 accommodated in the cassette 21 with another medium 99 having a different medium type as necessary. In addition, the user sets the recording conditions by operating the operation section 56 prior to printing, and in this case, it is possible to set in advance whether the medium type is automatic setting or manual setting. Hereinafter, the medium type determination control executed by the control section 16, illustrated in FIGS. 15 and 16 will be described.

First, in step S11, it is determined whether or not it is time to determine the medium type. In the embodiment, as an example, the process is performed when the cassette 21 is inserted. When the cassette sensor 68 detects that the cassette 21 is inserted, the control section 16 determines whether it is time to determine the medium type. This is because when the user takes out the cassette 21 from the housing 12 and then inserts the cassette 21 into the housing 12, the type of the medium 99 may be changed. In addition, the medium type determination time may be a time when a print job is received and the medium 99 reaches at a predetermined position in the middle of feeding to the recording head 40. Moreover, the medium type determination time may be provided as long as the medium 99 is on the placing section such as the cassette 21 or in the transporting path 18, and when the medium 99 is in the transporting path 18, the time is preferably before the recording is started by the recording head 40.

In step S12, the control section 16 moves the medium 99 to the imaging position. That is, the control section 16 drives the hopper driving section 25 to raise the hopper 24. In this case, when performing an automatic focusing control for detecting the imaging position is performed, the control section 16 controls the electric motor 25M of the hopper driving section 25, and causes the hopper 24 to dispose at a position at which the camera 60 is focused on the surface of the uppermost medium 99.

In step S13, the control section 16 turns on the first light source 61. As a result, the surface of the uppermost medium 99 on the hopper 24 is irradiated with the light obliquely to the surface of the medium 99 from the first light source 61 which is turned on, in the first direction along the transporting direction Y1.

In step S14, the control section 16 acquires first surface data of the medium. The control section 16 causes the camera 60 to image the surface of the medium 99. The camera 60 captures the image of the surface that is shaded due to the fine unevenness of the surface of the medium 99 by the light with which the surface is obliquely irradiated in the first direction. The control section 16 acquires the captured image as the first surface data.

In step S15, the control section 16 turns off the first light source 61.

In step S16, the control section 16 turns on the second light source 62. As a result, the surface of the uppermost medium 99 on the hopper 24 is irradiated with the light obliquely to the surface of the medium 99 from the second light source 62 which is turned on, in the second direction along the width direction X.

In step S17, the control section 16 acquires second surface data of the medium. The control section 16 causes the camera 60 to image the surface of the medium 99. The camera 60 captures the image of the surface that is shaded due to the fine unevenness of the surface of the medium 99 by the light with which the surface is obliquely irradiated in the second direction. The control section 16 acquires the captured image as the second surface data. Moreover, in the embodiment, the process of step S14 and S17 corresponds to an example of a surface information acquiring step.

In step S18, the control section 16 turns off the second light source 62.

In step S19, the control section 16 acquires the medium thickness t. The control section 16 drives the feeding section 13 to rotate forward the pickup roller 22 and the separation roller 23, and feed out the uppermost medium 99 on the hopper 24 to the detection position of the medium thickness sensor 64. As a result, the medium 99 which is fed out presses the lever 65 of the medium thickness sensor 64, so that the lever 65 is tilted at the tilt angle θk illustrated in FIG. 6 according to the thickness of the medium 99 from the standby position illustrated in FIG. 5. The medium thickness sensor 64 measures the medium thickness from the tilt angle θk of the lever 65. Moreover, in the embodiment, the process of step S19 corresponds to an example of a thickness information acquiring step.

In step S20, the control section 16 specifies vertical marking surface data and horizontal marking surface data from the first surface data and the second surface data. Here, directions of the vertical markings and the horizontal markings change depending on the size of the medium 99 and the direction in which the medium 99 is set. For example, in a case of A4 size and A3 size, in the longitudinal direction of the medium, one side is the vertical markings and the other side is the horizontal markings. In addition, even with the medium 99 of the same size, the directions of the vertical markings and the horizontal markings are reversed in a case where the medium 99 is set in the vertical direction and in a case where the medium 99 is set in the horizontal direction. The control section 16 specifies the directions of the vertical markings and the horizontal markings of the medium 99 based on the information of the medium size and the recording direction included in the recording condition information. The control section 16 specifies one of the first surface data and the second surface data as the vertical marking surface data and the other thereof as the horizontal marking surface data based on the vertical markings and the horizontal markings which are specified. A sensor capable of detecting the size and the direction of the medium 99 which is accommodated in the cassette 21 may be provided in the cassette 21, and the directions of the vertical markings and the horizontal markings of the medium 99 may be determined based on the detection result of the sensor.

In step S21, the control section 16 performs the medium type determination process. The control section 16 performs the medium type determination process by executing the medium type determination processing routine illustrated in FIG. 16. Hereinafter, the medium type determination process performed by the control section 16 will be described with reference to FIG. 16. Moreover, in the embodiment, the process of step S21 corresponds to an example of a determination step.

First, in step S31, the control section 16 acquires a first surface luminance characteristic based on the vertical marking surface data. Here, in the embodiment, since the surface data is acquired by imaging the surface 99A by the camera 60, the vertical marking surface data corresponds to the vertical marking image and the horizontal marking surface data corresponds to the horizontal marking image. The control section 16 binarizes the vertical marking image constituted with of F pixels in the unit area in the vertical marking surface data by changing a threshold of the luminance from 0 to 255 in order by "1". A curve Lx of the first surface luminance characteristic indicated by a solid line in FIG. 14 is obtained by plotting a gradation value of the luminance used for the threshold as the horizontal axis and the number W of white pixels in the obtained 256 binarized images as the vertical axis.

In step S32, the control section 16 acquires the first gradation value αx corresponding to the number A of pixels based on the first surface luminance characteristic. The control section 16 acquires the first gradation value αx corresponding to the number A of white pixels in the curve Lx of the first surface luminance characteristic indicated by the solid line in FIG. 14.

In step S33, the control section 16 acquires a second surface luminance characteristic based on the horizontal marking surface data. Here, the horizontal marking surface data corresponds to the horizontal marking image. The control section 16 binarizes the horizontal marking image constituted with F pixels in the unit area in the horizontal marking surface data by changing the threshold of the luminance from 0 to 255 in order by "1". A curve Ly of the second surface luminance characteristic indicated by a one-dot chain line in FIG. 14 is obtained by plotting a gradation value of the luminance used for the threshold as the horizontal axis and the number W of white pixels in the obtained 256 binarized images as the vertical axis.

In step S34, the control section 16 acquires the second gradation value αy corresponding to the number A of pixels based on the second surface luminance characteristic. The control section 16 acquires the second gradation value αy corresponding to the number A of white pixels in the curve Ly of the second surface luminance characteristic indicated by the one-dotted chain line in FIG. 14.

In step S35, the control section 16 determines the medium type with reference to a table corresponding to the medium thickness t based on the first gradation value αx and the second gradation value αy. That is, the determination section 72 narrows down the types of the media 99 based on the thickness information. Next, the determination section 72 specifies the type of the medium based on the surface information (αx, αy) in the types of the narrowed media 99. Specifically, the determination section 72 selects one of the first table TD1 and the second table TD2 corresponding to the medium thickness t, and specifies the medium type with reference to one table which is firstly selected based on the surface information (αx, αy). Since the surface information (αx, αy) includes vertical marking information and horizontal marking information for each medium type, the medium type can be determined more appropriately than a case where the surface information is simply used without distinguishing the vertical markings and the horizontal markings. Thus, when the medium type of the medium 99 is specified, the control section 16 proceeds to step S22 in FIG. 15.

In step S22, the control section 16 executes predetermined processes according to the medium type. Here, in the embodiment, as one of the predetermined processes, the control section 16 sets the recording conditions corresponding to the medium type when the medium 99 is fed from the cassette 21, in which the medium 99 of which the medium type is specified is accommodated, and the recording is performed. The control section 16 performs the recording on the medium 99 under the recording conditions corresponding to the specified medium type. Specifically, the control section 16 acquires the recording conditions according to the medium type with reference to the recording condition setting table PT read from the memory 71 based on the information of the specified medium type. For example, if the medium type is the "plain paper A" or the "plain paper B", the "standard print mode" is set as the recording conditions corresponding to the plain paper. The control section 16 controls the transport section 14 and the recording head 40 under the recording conditions according to the "standard print mode", and performs recording of an image onto the medium 99 which is the plain paper with relatively low print quality at high speed. On the other hand, if the medium type is the "dedicated paper A" or the "dedicated paper B", the "high definition print mode" is set as the recording conditions corresponding to the dedicated paper. The control section 16 controls the transport section 14 and the recording head 40 under the recording conditions according to the "high definition print mode", and performs recording of an image onto the medium 99 which is the dedicated paper with relatively high definition at low speed.

In addition, the control section 16 performs a registration process for registering the cassette 21 and the medium type in association with each other as another one of the predetermined processes. The memory 71 stores in advance the cassette registration table CT in which the medium type is registered in association with each cassette 21. When the cassette 21 is inserted, the cassette 21 and the specified medium type are in association with each other, and are registered in the cassette registration table CT based on the information of the specified medium type through the medium type determination control. In addition, since the medium 99 in the cassette 21 is replaced with the medium 99 having a different medium type while the power of the recording apparatus 11 is shut off, when the power source is turned on as the medium type determination time, the control section 16 performs the medium type determination control and specifies the medium type of the medium 99 in the cassette 21. If the specified medium type does not match the registered medium type which is registered in the cassette registration table CT with respect to the cassette 21, the control section 16 registers the specified medium type in the cassette registration table CT by being associated with the cassette 21. Thus, since the cassette registration table CT is automatically undated, it is possible to avoid disadvantage that printing is performed with a medium type different from a desired one even if the user forgets to register the medium type.

The above two predetermined processes are performed when the user selects in advance the automatic setting of the medium type. If the user does not select the automatic setting of the medium type, the following notification process is performed. When the user instructs the recording apparatus 11 to print, the user sets the recording condition information including the medium size, the medium type, the cassette, the print mode, and the like with a manual operation. If the medium type specified through the medium type determination control for the medium 99 in the cassette 21 specified by the recording condition information is different from the medium type specified from the recording condition information set by the user, the control section 16 notifies the user of the fact through a message displayed on the display section 57. In addition, when the cassette 21 is inserted, if the medium type specified through the medium type determination control does not match the medium type registered in the cassette registration table CT, the control section 16 notifies the user of the fact through a message displayed on the display section 57. In addition, when the user incorrectly sets the medium 99 such as the glossy paper having a distinction between front and back, the control section 16 can distinguish the front and back of the medium 99 to determine the medium type. If the control section 16 grasps that the front and back of the medium 99 are incorrectly set, the control section 16 notifies the user of a message of the fact by displaying the fact on the display section 57. As a result, the user can reverse the front and back to set the medium 99 again, and it is possible to avoid a recording error in which the recording surface is incorrectly recorded. Moreover, in the embodiment, the process of step S22 corresponds to an example of the processing step.

According to the embodiment, the following effects can be obtained.

(1) The recording apparatus 11 includes the recording head 40 performing recording on the medium 99, the cassette 21 on which the medium 99 transported to the recording head 40 is placed, and the transporting path 18 for transporting the medium 99 from the cassette 21 to the recording head 40. In addition, the recording apparatus 11 includes the medium thickness sensor 64 that measures the thickness of the medium 99 in the cassette 21 or the transporting path 18 to obtain the thickness information, the surface information acquisition section 58 that acquires the surface information of the medium 99 in the cassette 21 or the transporting path 18, and the determination section 72 that specifies the type of the medium 99 based on the thickness information and the surface information of the medium 99. Therefore, the type of the medium 99 is specified by obtaining the thickness information of the medium 99 and the surface information of the medium 99. Therefore, the type of the medium 99 can be specified with high accuracy.

(2) The surface information acquisition section 58 includes the light source irradiating the surface of the medium 99 with the light, and the camera 60 receiving the light reflected by the surface of the medium 99. Therefore, the surface information can be obtained by imaging the surface of the medium 99 which is irradiated with the light from the light source by the camera 60. Since the surface information in the imaging area of the surface of the medium 99 can be used, the type of the medium 99 can be specified with high accuracy.

(3) The first light source 61 of which the optical axis is directed in the direction along the transporting direction and the second light source 62 of which the optical axis is directed in the direction intersecting the transporting direction are provided. The first light source 61 and the second light source 62 obliquely irradiate the surface of the medium 99 with the light. Therefore, the surface information about the vertical markings and the surface information about the horizontal markings can be obtained with respect to the medium 99 having the vertical markings and the horizontal markings. Therefore, the type of the medium 99 can be appropriately specified by the thickness information of the medium 99, the surface information about the vertical markings, and the surface information about the horizontal markings of the medium 99.

(4) The first light source 61 and the second light source 62 sequentially emit light, the light reflected by the surface of the medium 99 is received by the camera 60 for each light emission, and the surface 99A of the medium 99 is imaged by the camera 60. Therefore, the type of the medium 99 can be specified with high accuracy by obtaining the thickness information of the medium 99, the surface information about the vertical markings, and the surface information about the horizontal markings of the medium 99.

(5) The camera 60 is a camera 60 that images the surface of the medium 99. The camera 60 receives light in the normal direction of the medium 99 at the position of intersection of the optical axis of the first light source 61 and the optical axis of the second light source 62. Therefore, since the surface information of the vertical markings and the horizontal markings of the medium 99 can be obtained, the type of the medium 99 can be further appropriately specified by the thickness information of the medium 99 and the surface information of the vertical markings and the horizontal markings of the medium 99.

(6) The reference surface is provided at a position facing the camera 60 on the placing surface of the cassette 21. In a state where the medium 99 is not placed on the cassette 21, the calibration is performed to adjust the light emission intensity of the light sources 61 and 62 based on the light receiving amount of the camera 60 which receives the light reflected by the reference surface of the light emitted from the light sources 61 and 62. Therefore, since the light emission intensity of the light sources 61 and 62 is appropriately adjusted by the calibration, the influence when paper dust or ink mist is attached to the light sources 61 and 62, or the camera 60, or the influence of aging of the light sources 61 and 62, or the camera 60 can be reduced, and the type of the medium 99 can be accurately specified.

(7) The surface information acquired by the surface information acquisition section 58 includes the first surface information about the vertical markings of the medium 99 and the second surface information about the horizontal markings of the medium 99. The table for the vertical markings to which the determination section 72 refers when narrowing down the types of the media 99 according to the first surface information, and the table for the horizontal markings to which the determination section 72 refers when narrowing down the types of the media 99 according to the second surface information are provided. Therefore, the determination section 72 narrows down the types of the media 99 by the thickness information of the medium 99, narrows down the types of the media 99 according to the first surface information about the vertical markings of the medium 99, and narrows down the types of the media 99 according to the second surface information about the horizontal markings of the medium 99. Therefore, the type of the medium 99 can be specified with high accuracy.

(8) The medium thickness sensor 64 is disposed in the transporting path 18, and the surface information acquisition section 58 is disposed at the position at which the surface information of the medium 99 can be acquired in a state the medium 99 is placed on the cassette 21. Therefore, since the surface information is acquired from the medium 99 placed on the cassette 21, the type of the medium can be specified in advance before feeding of the medium for recording is started. In addition, since the medium thickness sensor 64 is disposed in the transporting path 18, it is easy to accurately acquire the thickness information by measuring the thickness of one medium 99 fed out from the cassette 21 to the transporting path 18.

(9) The determination section 72 narrows down the types of the media 99 based on one of the thickness information and the surface information, and specifies the type of the medium 99 based on the other thereof from the narrowed types of the media 99. Therefore, the type of the medium 99 can be specified with high accuracy by the thickness information and the surface information.

(10) The determination section 72 narrows down the types of the media 99 based on the thickness information, and specifies the type of the medium 99 based on the surface information from the narrowed types of the media 99. Therefore, after the types of the media 99 are narrowed down based on the thickness information, the type of the medium 99 is specified based on the surface information from the narrowed types of the media 99. Therefore, in the process of narrowing down the types of the media 99 based on the surface information, even if the processing load is larger than that of the process of narrowing down based on the thickness information, the number of parameters when narrowing down the types of the media 99 based on the surface information is reduced. Therefore, the processing load when determining the type of the medium 99 can be reduced. Therefore, the type of the medium 99 can be specified at relatively high speed.

(11) The setting table in which the recording conditions are set according to the type of the medium 99 is provided. Therefore, recording can be performed onto the medium 99 under the recording conditions according to the type of the medium 99 obtained with reference to the setting table based on the specified type of the medium 99.

(12) The recording is executed under the recording conditions according to the type specified by the determination section 72. Therefore, since the recording is performed onto the medium under the recording conditions according to the type of the medium 99 specified by the determination section 72, it is possible to avoid recording under the recording conditions that do not match the type of the medium 99.

(13) The cassette 21 is a cassette 21 capable of accommodating the plurality of media 99. When the type of the medium 99 is set for each cassette 21 and the specified type is different from the type that is set, the setting of the cassette 21 corresponding to the set type is changed to the specified type.

Therefore, when the specified type is different from the set type, setting of the cassette 21 corresponding to the set type is changed to the specified type. When the user incorrectly sets or the user changes the medium stored in the cassette 21 to a medium of a different type, the setting of the type of the medium 99 corresponding to the cassette 21 can be changed without an operation of the user.

(14) The cassette 21 is configured to be removable from the housing of the recording apparatus. The detecting section detecting that the cassette 21 is inserted is further provided. When it is detected that the cassette 21 is inserted, the medium thickness sensor 64 acquires the thickness information, the surface information acquisition section 58 acquires the surface information, and the determination section 72 specifies the type of the medium 99 based on the thickness information and the surface information. Therefore, when the user inserts the cassette 21 in which the type of the medium 99 accommodated in the cassette 21 may be changed, the type of the medium 99 can be specified.

(15) The display section 57 is provided to notify when the medium type specified by the determination section 72 is different from the set medium type. Therefore, the display section 57 can notify the user that the type specified by the determination section 72 and the set type are different. Therefore, the user can know that the type of the medium 99 is incorrect, and can appropriately cope with the fact by exchanging the medium 99 or the like. As a result, it is possible to prevent in advance errors that recording is performed onto the medium 99 of a medium type different from a desired medium type.

(16) The method of controlling the recording apparatus including the recording head 40 performing recording on the medium 99, the cassette 21 on which the medium 99 transported to the recording head 40 is placed, and the transporting path 18 for transporting the medium 99 from the cassette 21 to the recording head 40 is provided. The control method includes the thickness information acquiring step (S19) of acquiring the thickness information by measuring the thickness of the medium 99 in the cassette 21 or the transporting path 18, and the surface information acquiring steps (S14 and S17) of acquiring the surface information of the medium 99 in the cassette 21 or the transporting path 18. In addition, the control method includes the determination step (S21) of specifying the type of the medium 99 based on the thickness information and the surface information of the medium 99, and the processing step (S22) of performing a predetermined process according to the type of the medium 99 determined by the determination step. According to the control method, the same effect as the effect (1) can be obtained.

Moreover, the embodiment can be modified into y following forms.

Figure 17:
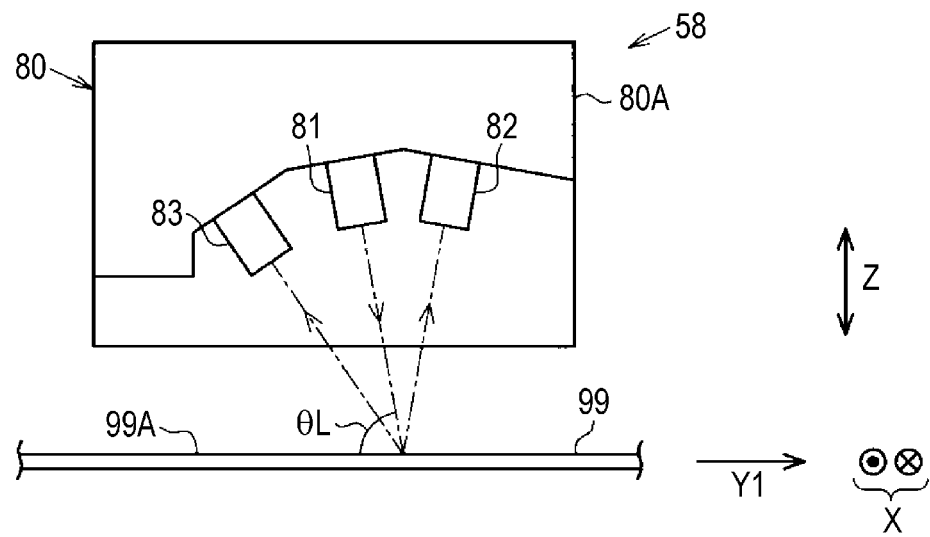
FIG. 17 is a schematic view illustrating an optical sensor constituting a surface information acquisition section of a modification example.

The surface information acquisition section 58 may be a sensor that optically acquires the surface information of the medium 99 instead of the imaging section such as the camera 60. For example, an optical sensor 80 illustrated in FIG. 17 can be used. The optical sensor 80 includes a light emitting section 81 as an example of a light source, a first light receiving section 82 as an example of a light receiving section that receives specularly reflected light which is emitted from the light emitting section 81 and reflected by the surface 99A of the medium 99, and a second light receiving section 83 as an example of a light receiving section that receives diffused light which is emitted from the light emitting section 81 and reflected by the surface 99A of the medium 99. The light emitting section 81, the first light receiving section 82, and the second light receiving section 83 are supported by a support section 80A so as to satisfy a predetermined positional relationship. As the optical sensor 80, two sensors are provided such as a first optical sensor 80 illustrated in FIG. 17 in which an optical axis of the light emitting section 81 is the first direction along the transporting direction Y1, and a second optical sensor (not illustrated) in which the optical axis of the light emitting section 81 is the second direction along the width direction X. In this case, the light emitting section 81 of the first optical sensor 80 corresponds to an example of the first light source, and the light emitting section 81 of the second optical sensor corresponds to an example of the second light source. In the example illustrated in FIG. 17, although the irradiation angle θL is relatively large, the irradiation angle θL can be appropriately set such that the appearance of the shade of the unevenness of the surface 99A is significantly different between the vertical markings and the horizontal markings. The optical sensor 80 outputs a ratio of a first light receiving amount received by the first light receiving section 82 to a second light receiving amount received by the second light receiving section 83 as an output value to the control section 16. The control section 16 acquires each output value from the two optical sensors 80 as the surface information. That is, one of the output values is the first surface information about the vertical markings of the medium 99, and the other thereof is the second surface information about the horizontal markings. The control section 16 determines the type of the medium 99 based on the first surface information, the second surface information, and medium thickness information acquired by the medium thickness sensor 64.

Figure 18:
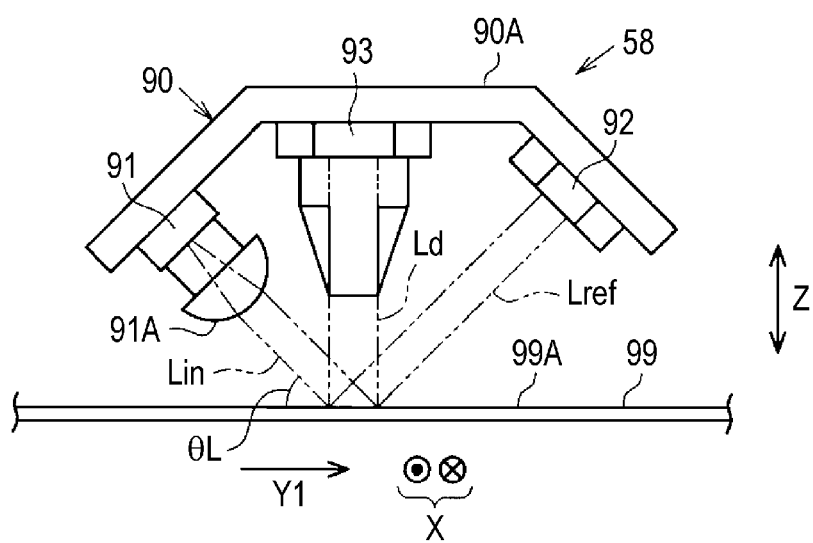
FIG. 18 is a schematic view illustrating an optical sensor constituting a surface information acquisition section of a modification example different from that of FIG. 17.

The surface information acquisition section 58 may be an optical sensor 90 illustrated in FIG. 18. The optical sensor 90 includes a light emitting section 91 as an example of a light source formed of a high color rendering LED or the like. The light emitting section 91 has a condenser lens 91A. In addition, the optical sensor 90 includes a first light receiving section 92 as an example of a light receiving section that receives a specularly reflected light Lref reflected by the surface 99A of the medium 99 by an incident light Lin including an RGB light emitted from the light emitting section 91, and a second light receiving section 93 as an example of a light receiving section that receives a diffused light Ld reflected by the surface 99A of the medium 99 by the incident light Lin formed of the RGB light emitted from the light emitting section 91. The light emitting section 91, the first light receiving section 92, and the second light receiving section 93 are supported by a support section 90A so as to satisfy a predetermined positional relationship. As the optical sensor 90, two sensors are provided such as a first optical sensor 90 illustrated in FIG. 18 in which an optical axis of the light emitting section 91 is the first direction along the transporting direction Y1, and a second optical sensor (not illustrated) in which the optical axis of the light emitting section 91 is the second direction along the width direction X. In this case, the light emitting section 91 of the first optical sensor 90 corresponds to an example of the first light source, and the light emitting section 91 of the second optical sensor corresponds to an example of the second light source. In the example illustrated in FIG. 18, although the irradiation angle θL is relatively large, the irradiation angle θL can be appropriately set such that the appearance of the shade of the unevenness of the surface 99A can be significantly different between the vertical markings and the horizontal markings. The optical sensor 90 outputs a ratio of a first light receiving amount received by the first light receiving section 92 and a second light receiving amount received by the second light receiving section 93 as an output value to the control section 16. In addition, the optical sensor 90 outputs a ratio of a light receiving amount by each of the RGB received by the first light receiving section 92. The control section 16 acquires each output value of two types from the two optical sensors 90 as the surface information. That is, one of the output values is the first surface information about the vertical markings of the medium 99, and the first surface information includes information of the ratio of the first light receiving amount and the second light receiving amount, and information of the ratio of the light receiving amount by each of the RGB in the specularly reflected light Lref. In addition, the other of the output values is the second surface information about the horizontal markings of the medium 99, and the second surface information includes information of the ratio of the first light receiving amount and the second light receiving amount, and information of the ratio of the light receiving amount by each of the RGB in the specularly reflected light Lref. The control section 16 determines the type of the medium 99 based on the first surface information, the second surface information, and medium thickness information acquired by the medium thickness sensor 64.

Figure 19:
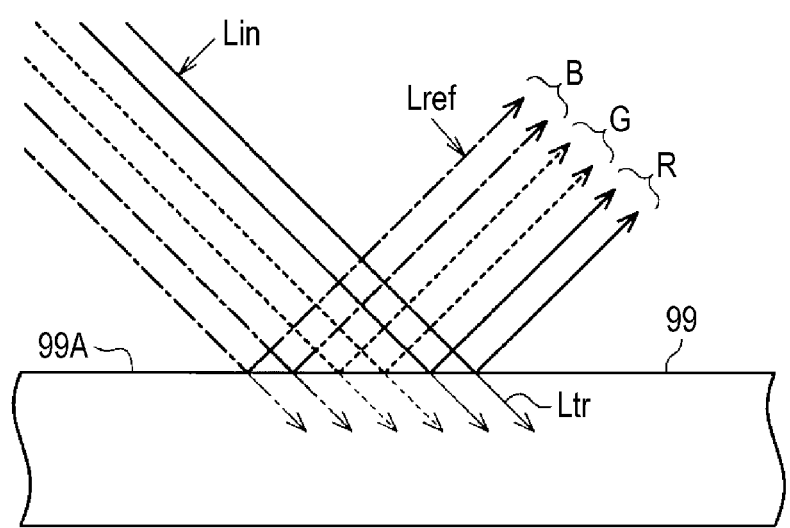
FIG. 19 is a schematic view for explaining a principle that the optical sensor acquires surface information.

Here, a relationship between the ratio of the light amount by each of the RGB in the specularly reflected light Lref and the type of the medium 99 will be described with reference to FIG. 19. As illustrated in FIG. 19, the incident light Lin formed of the RGB light is reflected by the surface 99A of the medium 99. In this case, a light Ltr which is a part of the incident light Lin is transmitted through the medium 99 or absorbed by the medium 99, and the other remaining portion is received by the first light receiving section 92 as the specularly reflected light Lref. The light Ltr transmitted through and absorbed by the medium 99 is determined by a form, a material, or the like of the surface of the medium 99, and depends on the type of the medium 99. Therefore, the information of the ratio of the light receiving amount by each of the RGB based on the output of the first light receiving section 92 that receives the specularly reflected light Lref depends on the type of the medium 99. The control section 16 determines the medium type based on the first surface information indicated by the ratio of the light receiving amount by each of the RGB about the vertical markings of the medium 99, the second surface information indicated by the ratio of the light receiving amount by each of the RGB about the horizontal markings of the medium 99, and the thickness information in the output values from the optical sensor. In this case, it is further preferable that the control section 16 narrow down the medium types from more information by using the surface information indicated by the ratio of the first light receiving amount and the second light receiving amount to determine the medium type.

The placing section is not limited to the cassette 21 as an example of the storage section. The placing section may be a paper feed tray which extends outside the housing 12 at the time of use and on which the plurality of media 99 can be placed. The paper feed tray includes a hopper and when the hopper moves upward, an uppermost sheet of the media stacked on the paper feed tray abuts against the pickup roller. In this case, the surface information acquisition section 58 acquires the surface information of the medium 99 placed on the paper feed tray, and the thickness information acquisition section such as the medium thickness sensor 64 acquires the thickness information. The control section 16 determines the medium type based on the surface information and the thickness information. For example, a sensor may be provided to detect that the medium is placed on the paper feed tray, and the time when it is detected that the medium is placed may be taken as the medium type determination time. In addition, the time when the recording instruction is accepted may be the medium type determination time. In this case, the acquisition of both the surface information and the thickness information may be performed on the paper feed tray or may be performed on the transporting path. In addition, the acquisition of the surface information may be performed in advance on the paper feed tray and the acquisition of the thickness information may be performed in the transporting path.

After the thickness information is acquired, the surface information may be acquired. In this case, the surface information of the medium may be acquired at the position at which the thickness information is acquired.

The thickness information acquisition section is not limited to the contact-type sensor such as the medium thickness sensor 64 having the lever 65. The thickness information acquisition section may be configured of a noncontact-type sensor. The thickness information acquisition section may be configured of, for example, an optical sensor, a magnetic sensor, or an ultrasonic sensor. For example, a distance sensor may be used. In addition, if the sensor is capable of detecting the thickness of one medium 99 even when the media 99 are stacked, the thickness information of the medium 99 may be acquired on the placing section such as the hopper 24 or the paper feed tray.

The determination section 72 may narrow down the types of the recording media based on the surface information, and specify the type of the recording medium based on the thickness information among the types of the recording media.

The surface information may not include both the surface information about the vertical markings and the surface information about the horizontal markings. Only the surface information about the vertical markings may be used, or only the surface information about the horizontal markings may be used. In addition, a configuration may be used in which the surface of the medium is obliquely irradiated with light in a direction intersecting at substantially 45 degrees with respect to the vertical markings and the horizontal markings, and the reflected light from the surface of the medium is received by the light receiving section, or the imaging section captures an image.

The notification section is not limited to the display section 57, and may be a sound generation section for notifying by sound. In addition, notification may be provided by both the display and the sound.

The control section 16 has a configuration realized by software by the computer 70 that executes a program, in addition, may be realized by, for example, hardware by an electronic circuit (for example, semiconductor integrated circuit) such as a field-programmable gate array (FPGA) or an Application Specific IC (ASIC), or may be realized by cooperation of software and hardware.

The medium is not limited to the sheet, and may be a synthetic resin film or sheet, cloth, non-woven fabric, laminate sheet, or the like. Moreover, if two types of the surface information that distinguishes between the vertical markings and the horizontal markings of the medium are used for the determination, it is preferable that a determination target includes a sheet.

The recording apparatus is not limited to the multifunction peripheral and may be a printer dedicated to printing, which does not have a scanner mechanism and a copying function.

The recording apparatus 11 is not limited to a liquid discharge system such as an ink jet system, and may be a dot impact system or an electrophotographic system.

Hereinafter, the technical ideas grasped from the above-described embodiment and the modification example will be transferred together with the effects.

The recording apparatus includes a recording head performing recording on a recording medium; a placing section on which the recording medium to be transported to the recording head is placed; a transporting path for transporting the recording medium from the placing section to the recording head; a thickness information acquisition section acquiring thickness information by measuring a thickness of the recording medium in the placing section or the transporting path; a surface information acquisition section acquiring surface information of the recording medium in the placing section or the transporting path; and a determination section specifying a type of the recording medium based on the thickness information and the surface information of the recording medium.

According to the configuration, the type of the recording medium is specified by obtaining the thickness information of the recording medium and the surface information of the recording medium. Therefore, the type of the recording medium can be specified with high accuracy.

In the recording apparatus, the surface information acquisition section may include a light source irradiating a surface of the recording medium with light and a light receiving section receiving light that is reflected by the surface of the recording medium.

According to the configuration, the surface information can be obtained by irradiating the light from the light source and receiving the light reflected by the surface of the recording medium by the light receiving section. Since the surface information in the imaging area of the surface of the recording medium can be used, the type of the recording medium can be specified with high accuracy.

In the recording apparatus, the light source may include a first light source of which an optical axis is directed in a direction along a transporting direction and a second light source of which an optical axis is directed in a direction intersecting the transporting direction, and the first light source and the second light source may irradiate the surface of the recording medium with light in a direction oblique to the surface of the recording medium.

According to the configuration, the surface information about the vertical markings and the surface information about the horizontal markings of the recording medium can be obtained with respect to the recording medium having the vertical markings and the horizontal markings. Therefore, the type of the recording medium can be appropriately specified by the thickness information of the recording medium, the surface information about the vertical markings, and the surface information about the horizontal markings of the recording medium.

In the recording apparatus, the first light source and the second light source may sequentially emit light, and the light receiving section may respectively receive light.

According to the configuration, the type of the recording medium can be specified with high accuracy by obtaining the thickness information of the recording medium, the surface information about the vertical markings, and the surface information about the horizontal markings of the recording medium.

In the recording apparatus, the light receiving section may be an imaging section that images the surface of the recording medium, and the imaging section may receive light at a position of an intersection of the optical axis of the first light source and the optical axis of the second light source in a normal direction of the recording medium.

According to the configuration, since the surface information of the vertical markings and the horizontal markings of the recording medium can be obtained, the type of the recording medium can be further appropriately specified by the thickness information of the recording medium and the surface information of the vertical markings and the horizontal markings of the recording medium.

In the recording apparatus, a reference surface may be provided at a position facing the light receiving section on a placing surface of the placing section, and in a state where the recording medium is not placed on the placing section, calibration for adjusting a light emission intensity of the light source may be performed based on an amount of light received by the light receiving section that receives light reflected by the reference surface of the light emitted from the light source.

According to the configuration, since the light emission intensity of the light sources is appropriately adjusted by the calibration, the influence when paper dust or ink mist is attached to the light sources or light receiving section, or the influence of aging of the light sources or light receiving section can be reduced, and the type of the recording medium can be accurately specified.

In the recording apparatus, the surface information acquired by the surface information acquisition section may include first surface information about vertical markings of the recording medium and second surface information about horizontal markings of the recording medium, and a table for the vertical markings to which the determination section refers when narrowing down the types of the recording media according to the first surface information, and a table for the horizontal markings to which the determination section refers when narrowing down the types of the recording media according to the second surface information may be provided.

According to the configuration, the determination section narrows down the types of the recording media by the thickness information of the recording medium, narrows down the types of the recording media according to the first surface information about the vertical markings of the recording medium, and narrows down the types of the recording media according to the second surface information about the horizontal markings of the recording medium. Therefore, the type of the recording medium can be specified with high accuracy.

In the recording apparatus, the thickness information acquisition section may be disposed in the transporting path, and the surface information acquisition section may be disposed at a position at which the surface information of the recording medium placed on the placing section is configured to be acquired.

According to the configuration, since the surface information is acquired from the recording medium placed on the placing section, the type of the medium can be specified in advance before feeding of the medium for recording is started. In addition, since the thickness information acquisition section is disposed in the transporting path, it is easy to accurately acquire the thickness information by measuring the thickness of one recording medium fed out from the placing section to the transporting path.

In the recording apparatus, the determination section may narrow down the types of the recording media based on any one of the thickness information and the surface information, and may specify the type of the recording medium based on the other, among the narrowed-down types of the recording media.

According to the configuration, the type of the recording medium can be specified with high accuracy the thickness information and the surface information.

In the recording apparatus, the determination section may narrow down the types of the recording media based on the thickness information, and may specify the type of the recording medium based on the surface information, among the narrowed-down types of the recording media.

According to the configuration, after the type of the medium is narrowed down based on the thickness information, the type of the recording medium is specified based on the surface information from the narrowed types of the recording medium. Therefore, in the process of narrowing down the types of the recording media based on the surface information, even if the processing load is larger than that of the process of narrowing down based on the thickness information, the number of parameters when narrowing down the types of the recording media based on the surface information is reduced, thereby reducing a processing load when determining the type of the recording medium. Therefore, the type of the recording medium can be determined with relatively high speed.

In the recording apparatus, a setting table for setting recording conditions according to the type of the recording medium may be provided.

According to the configuration, recording can be performed onto the recording medium under the recording conditions according to the type of the recording medium obtained with reference to the setting table based on the type of the specified recording medium.

In the recording apparatus, recording may be executed under a recording condition according to the type specified by the determination section.

According to the configuration, since the recording is performed onto the medium under the recording conditions according to the type of the recording medium specified by the determination section, it is possible to avoid recording under the recording conditions that do not match the type of the recording medium.

In the recording apparatus, the placing section may be a storage section configured to accommodate a plurality of the recording media, and when the type of the recording medium is set for each storage section and the specified type is different from the set type, setting of the storage section corresponding to the set type may be changed to the specified type.

According to the configuration, when the specified type is different from the set type, setting of the storage section corresponding to the set type is changed to the specified type. When the user incorrectly sets or the user changes the medium stored in the storage section to a medium of a different type, the setting of the type of the recording medium corresponding to the storage section can be changed without an operation of the user.

In the recording apparatus, the placing section may be a storage section configured to accommodate a plurality of the recording media, the storage section may be configured to be detachably attached to a housing of the recording apparatus, the recording apparatus may further include a detecting section detecting that the storage section is inserted, and when it is detected that the storage section is inserted, the thickness information acquisition section may acquire the thickness information, the surface information acquisition section may acquire the surface information, and the determination section may specify the type of the recording medium based on the thickness information and the surface information.

According to the configuration, it is possible to specify the type of the recording medium when the user inserts the storage section in which the type of the recording medium stored in the storage section may be changed.

In the recording apparatus, the recording apparatus may further include a notification section performing notification when the type specified by the determination section is different from a set type.

According to the configuration, notification section can notify the user that the type specified by the determination section and the set type are different. Therefore, the user can know that the type of the recording medium is incorrect, and can appropriately cope with the fact by exchanging the recording medium or the like. As a result, it is possible to prevent in advance errors that recording is performed onto the recording medium of a type different from a desired type.

The method of controlling a recording apparatus including a recording head performing recording on a recording medium, a placing section on which the recording medium to be transported to the recording head is placed, and a transporting path for transporting the recording medium from the placing section to the recording head, the method including: a thickness information acquiring step of acquiring thickness information by measuring a thickness of the recording medium in the placing section or the transporting path; a surface information acquiring step of acquiring surface information of the recording medium in the placing section or the transporting path; a determination step of specifying a type of the recording medium based on the thickness information and the surface information of the recording medium; and a processing step of performing a predetermined process according to the type of the recording medium determined in the determination step. According to the method, the same operational effects as those of the recording apparatus can be obtained.

What is claimed is:
1. A recording apparatus comprising:
a recording head performing recording on a recording medium;
a placing section on which the recording medium to be transported to the recording head is placed;
a transporting path for transporting the recording medium from the placing section to the recording head;

a thickness information acquisition section acquiring thickness information by measuring a thickness of the recording medium in the placing section or the transporting path;

a surface information acquisition section acquiring surface information of the recording medium in the placing section or the transporting path; and a determination section specifying a type of the recording medium based on the thickness information and the surface information of the recording medium.

2. The recording apparatus according to claim 1, wherein the surface information acquisition section includes a light source irradiating a surface of the recording medium with light and a light receiving section receiving light that is reflected by the surface of the recording medium.

3. The recording apparatus according to claim 2, wherein the light source includes a first light source of which an optical axis is directed in a direction along a transporting direction and a second light source of which an optical axis is directed in a direction intersecting the transporting direction, and the first light source and the second light source irradiate the surface of the recording medium with light in a direction oblique to the surface of the recording medium.

4. The recording apparatus according to claim 3, wherein the first light source and the second light source sequentially emit light, and the light receiving section respectively receives light.

5. The recording apparatus according to claim 3, wherein the light receiving section is an imaging section that images the surface of the recording medium, and the imaging section receives light at a position of an intersection of the optical axis of the first light source and the optical axis of the second light source in a normal direction of the recording medium.

6. The recording apparatus according to claim 2, wherein a reference surface is provided at a position facing the light receiving section on a placing surface of the placing section, and in a state where the recording medium is not placed on the placing section, calibration for adjusting a light emission intensity of the light source is performed based on an amount of light received by the light receiving section that receives light reflected by the reference surface of the light emitted from the light source.

7. The recording apparatus according to claim 1, wherein the surface information acquired by the surface information acquisition section includes first surface information about vertical markings of the recording medium and second surface information about horizontal markings of the recording medium, and a table for the vertical markings to which the determination section refers when narrowing down the types of the recording media according to the first surface information, and a table for the horizontal markings to which the determination section refers when narrowing down the types of the recording media according to the second surface information are provided.

8. The recording apparatus according to claim 1, wherein the thickness information acquisition section is disposed in the transporting path, and the surface information acquisition section is disposed at a position at which the surface information of the recording medium placed on the placing section is configured to be acquired.

9. The recording apparatus according to claim 8, wherein the determination section narrows down the types of the recording media based on any one of the thickness information and the surface information, and specifies the type of the recording medium based on the other, among the narrowed-down types of the recording media.

10. The recording apparatus according to claim 1, wherein the determination section narrows down the types of the recording media based on the thickness information, and specifies the type of the recording medium based on the surface information, among the narrowed-down types of the recording media.

11. The recording apparatus according to claim 1, wherein a setting table for setting recording conditions according to the type of the recording medium is provided.

12. The recording apparatus according to claim 1, wherein recording is executed under a recording condition according to the type specified by the determination section.

13. The recording apparatus according to claim 1, wherein the placing section is a storage section configured to accommodate a plurality of the recording media, and when the type of the recording medium is set for each storage section and the specified type is different from the set type, setting of the storage section corresponding to the set type is changed to the specified type.

14. The recording apparatus according to claim 1, wherein the placing section is a storage section configured to accommodate a plurality of the recording media, the storage section is configured to be detachably attached to a housing of the recording apparatus, the recording apparatus further comprises a detecting section detecting that the storage section is inserted, and when it is detected that the storage section is inserted, the thickness information acquisition section acquires the thickness information, the surface information acquisition section acquires the surface information, and the determination section specifies the type of the recording medium based on the thickness information and the surface information.

15. The recording apparatus according to claim 1, further comprising:

a notification section performing notification when the type specified by the determination section is different from a set type.

* * * * *